US012704706B2

(12) United States Patent
Tang et al.

(10) Patent No.: US 12,704,706 B2
(45) Date of Patent: Aug. 11, 2026

(54) INSTANTANEOUS NON-DIFFRACTING LIGHT SHEETS

(71) Applicant: University of Central Florida Research Foundation, Inc., Orlando, FL (US)

(72) Inventors: Jialei Tang, Orlando, FL (US); Vahid Ebrahimi, Orlando, FL (US); Kyu Young Han, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 1212 days.

(21) Appl. No.: 17/236,941

(22) Filed: Apr. 21, 2021

(65) Prior Publication Data

US 2021/0325652 A1 Oct. 21, 2021

Related U.S. Application Data

(60) Provisional application No. 63/013,182, filed on Apr. 21, 2020.

(51) Int. Cl.
*G02B 21/06* (2006.01)
*G01N 21/64* (2006.01)
(Continued)

(52) U.S. Cl.
CPC ......... *G02B 21/06* (2013.01); *G01N 21/6458* (2013.01); *G02B 3/06* (2013.01);
(Continued)

(58) Field of Classification Search
None
See application file for complete search history.

(56) References Cited

U.S. PATENT DOCUMENTS

2002/0153422 A1* 10/2002 Tsikos ................ G06K 7/10742 235/454
2013/0286181 A1* 10/2013 Betzig ...................... H04N 7/18 348/79

(Continued)

OTHER PUBLICATIONS

Cao et al., "Complex Lasers with Controllable Coherence," Jul. 2018, 21 pages.

(Continued)

*Primary Examiner* — Sharrief I Broome
*Assistant Examiner* — Journey F Sumlar
(74) *Attorney, Agent, or Firm* — Suiter Swantz IP

(57) ABSTRACT

An illumination system may include an illumination source, a line-projection system to simultaneously illuminate a pupil plane with a static distribution of a plurality of one-dimensional (1D) coherent beams. Each of the 1D coherent beams of the plurality of 1D coherent beams may extend lengthwise along a coherent direction between boundaries of the pupil plane, have a width along an incoherent direction perpendicular to the coherent direction, and are distributed in a parallel distribution along the incoherent direction. Each of the 1D coherent beams of the plurality of 1D coherent beams is also spatially coherent along the coherent direction and spatially incoherent along the incoherent direction. The system may further include an objective lens to form a light sheet in an imaging plane based on an incoherent superposition of the plurality of 1D coherent beams.

34 Claims, 23 Drawing Sheets

(51) Int. Cl.

| | |
|---|---|
| ***G02B 3/06*** | (2006.01) |
| ***G02B 21/02*** | (2006.01) |
| ***G02B 21/16*** | (2006.01) |
| ***G02B 21/26*** | (2006.01) |
| ***G02B 21/36*** | (2006.01) |
| ***G02B 27/09*** | (2006.01) |
| ***G02B 27/48*** | (2006.01) |

(52) U.S. Cl.

CPC ............. *G02B 21/02* (2013.01); *G02B 21/16* (2013.01); *G02B 21/26* (2013.01); *G02B 21/367* (2013.01); *G02B 27/0927* (2013.01); *G02B 27/0966* (2013.01); *G02B 27/48* (2013.01); *G01N 2021/6469* (2013.01); *G01N 2021/6478* (2013.01); *G01N 2201/061* (2013.01)

(56) References Cited

U.S. PATENT DOCUMENTS

| | | | | |
|---|---|---|---|---|
| 2018/0074305 A1* | 3/2018 | Atzler | .................. | G02B 21/361 |
| 2018/0188179 A1* | 7/2018 | Keller | .................. | G02B 21/362 |
| 2019/0025563 A1* | 1/2019 | Fahrbach | ............... | G02B 21/06 |
| 2019/0278072 A1* | 9/2019 | Fahrbach | ............... | G02B 21/16 |
| 2019/0295804 A1* | 9/2019 | Delgado | ............... | H01J 37/244 |
| 2022/0099577 A1* | 3/2022 | Harms | ............... | G01N 21/6458 |

OTHER PUBLICATIONS

Chang et al., "Universal light-sheet generation with field synthesis," Nature Methods, vol. 16, Mar. 2019, 6 pages.
Chen et al., "Lattice light-sheet microscopy: Imaging molecules to embryos at high spatiotemporal resolution," Science, vol. 346, Issue 6208, Oct. 24, 2014, 13 pages.
Chriki et al., "Manipulating the spatial coherence of a laser source," Optics Express, vol. 23, No. 10, May 18, 2015, 9 pages.
Huisken et al., "Optical Sectioning Deep Inside Live Embryos by Selective Plane Illumination Microscopy," Science, vol. 305, Aug. 13, 2004, 4 pages.
Keller et al., "Visualizing Whole-Brain Activity and Development at the Single-Cell Level Using Light-Sheet Microscopy," Neuron 85, Feb. 4, 2015, 22 pages.
Keller et al., "Reconstruction of Zebrafish Early Embryonic Development by Scanned Light Sheet Microscopy," Science, vol. 322, Nov. 14, 2008, 5 pages.
Kondakci et al., "Diffraction-free space-time light sheets," Nature Photonics, vol. 11, Nov. 2017, 9 pages.
Planchon et al., "Rapid three-dimensional isotropic imaging of living cells using Bessel beam plane illumination," Nature Methods, vol. 8, No. 5, May 2011, 10 pages.
Power et al., "A guide to light-sheet fluorescence microscopy for multiscale imaging," Nature America, Inc., Nature Methods, vol. 14, No. 4, Apr. 2017, 14 pages.
Tang et al., "Fluorescence imaging with tailored light," Nanophotonics, 2019, 18 pages.
Vettenburg et al., "Light-sheet microscopy using an Airy beam," Nature Methods, vol. 11, No. 5, May 2014, 6 pages.

* cited by examiner

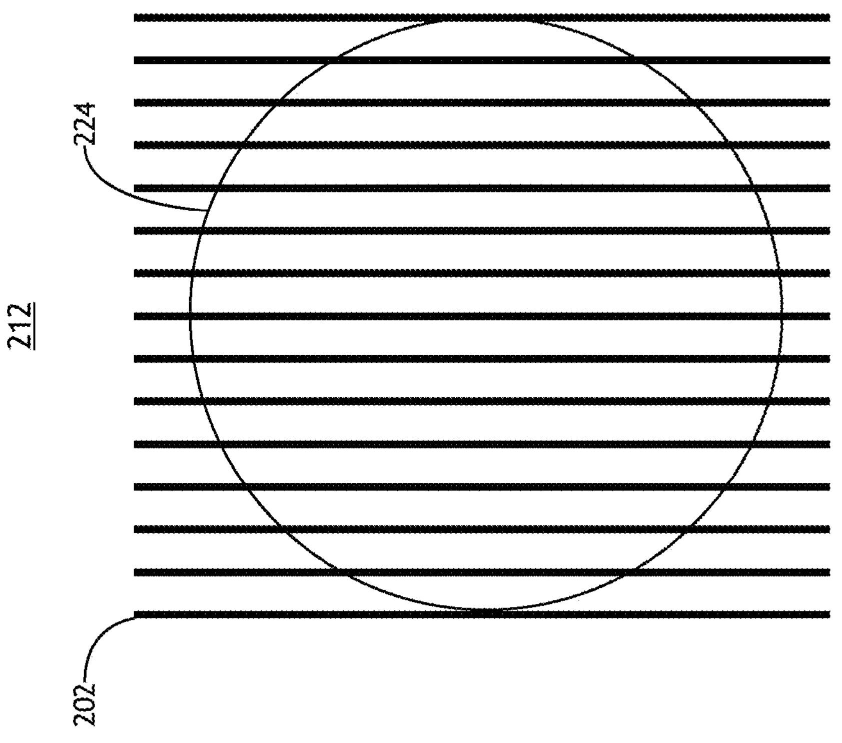
212
224
202
X
Y
FIG. 2D

228

212

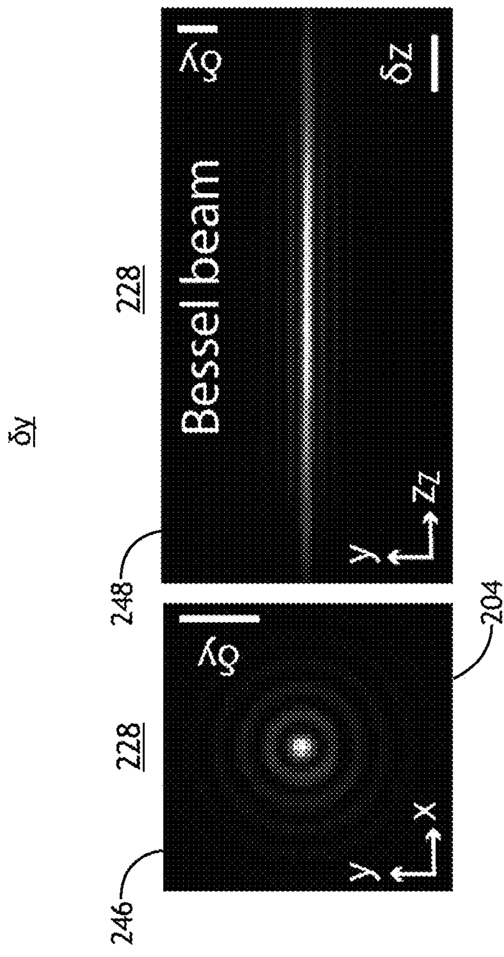
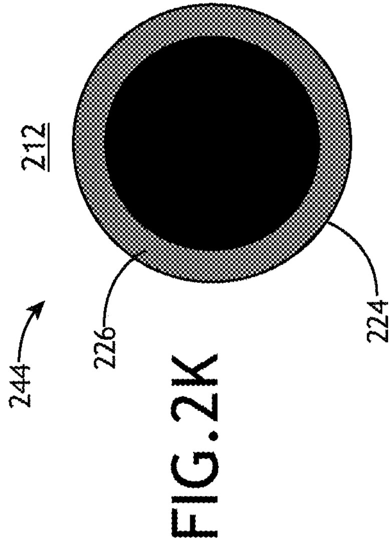
FIG. 2K
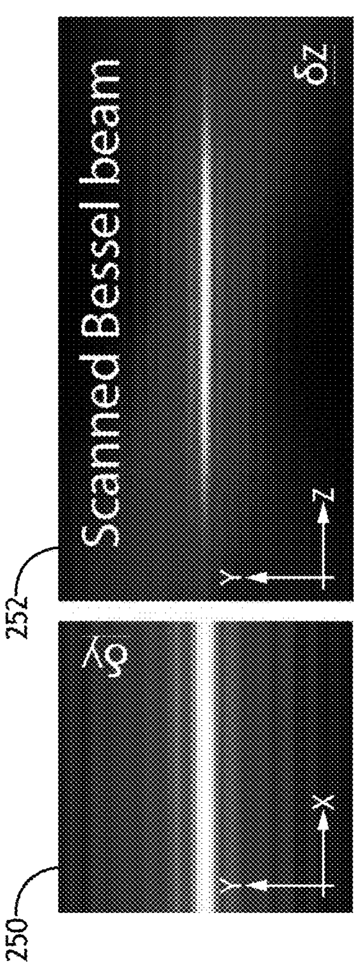
FIG. 2L

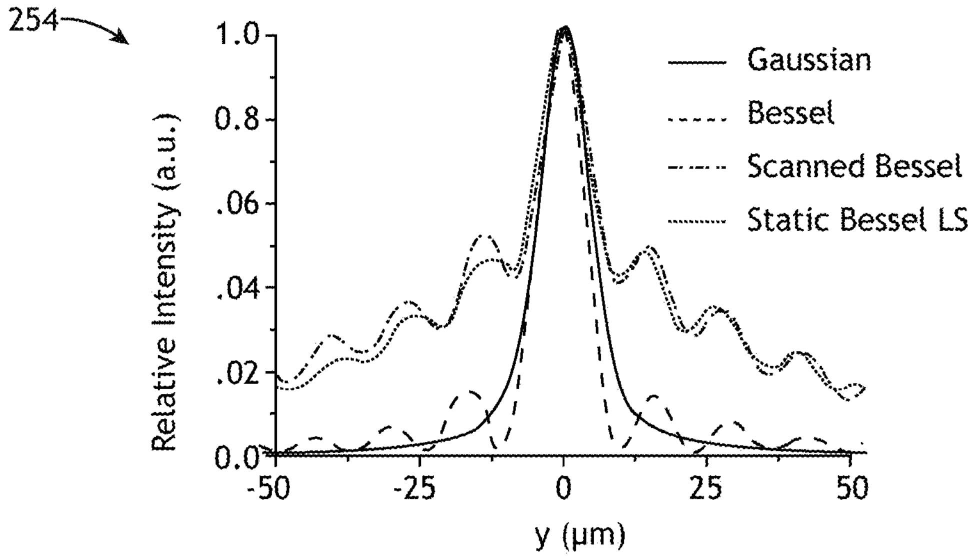
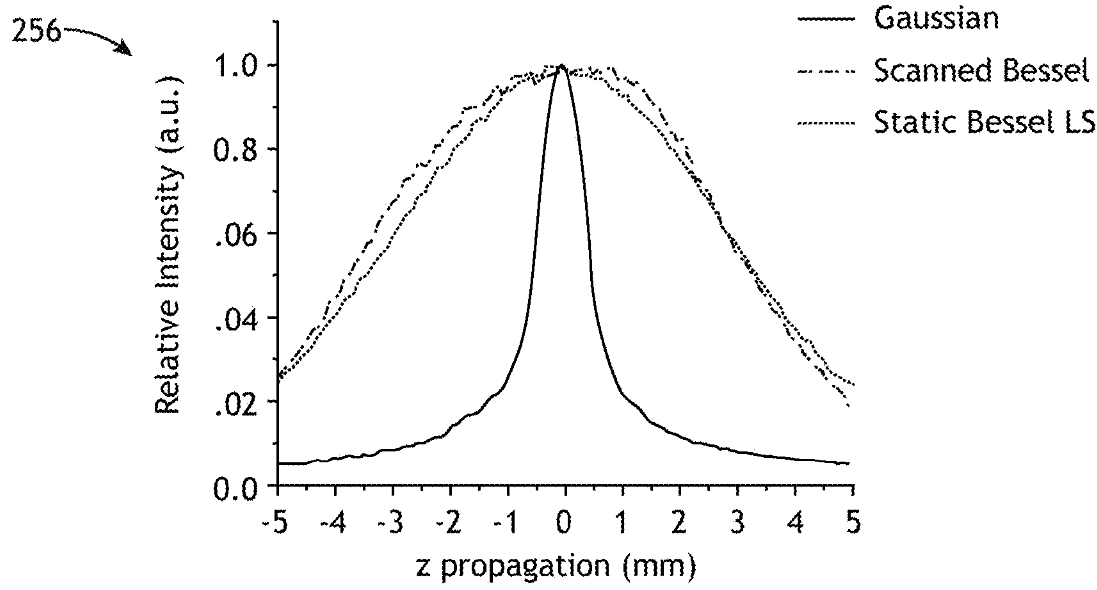
FIG.2M

260
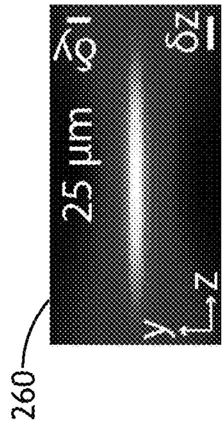
258
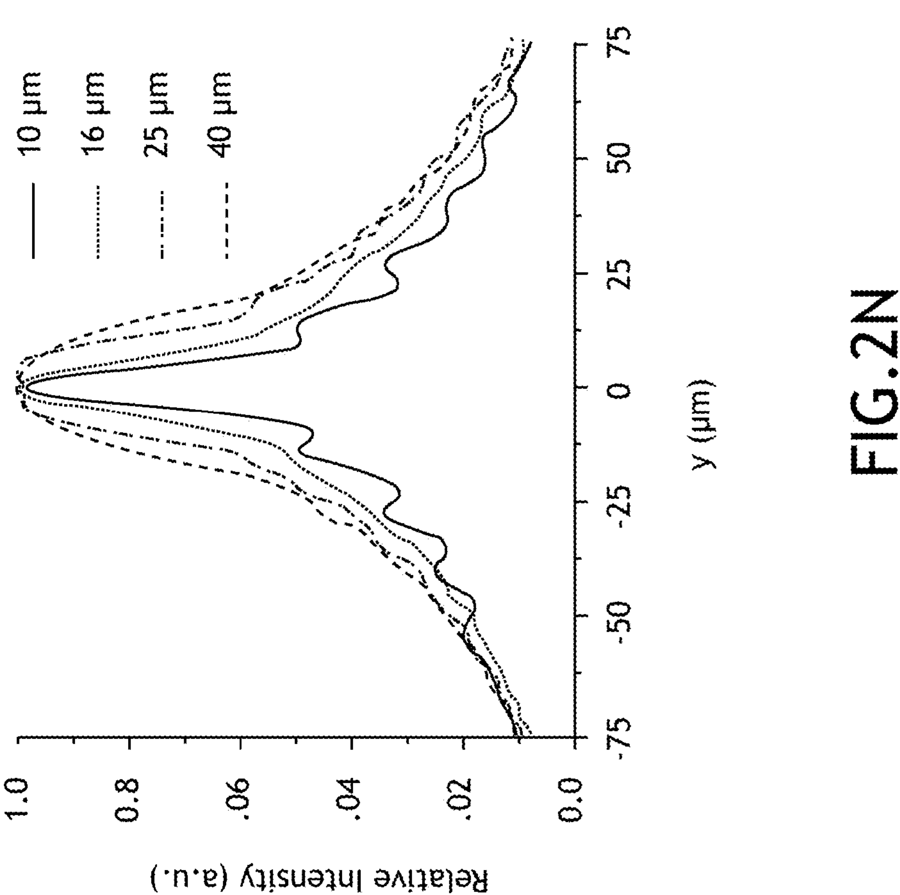
FIG.2N 322
226
324
212
324
228
326
228
X
Y
Z 328
324
202
212
330
228
332
228
X
Y
Z 334
324
202
212
226
230
336
228
338
228
X
Y
Z

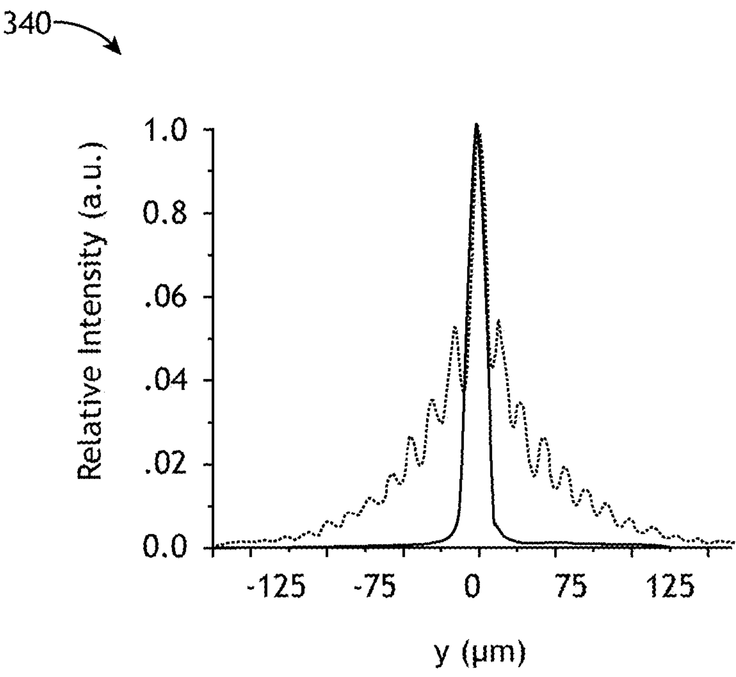
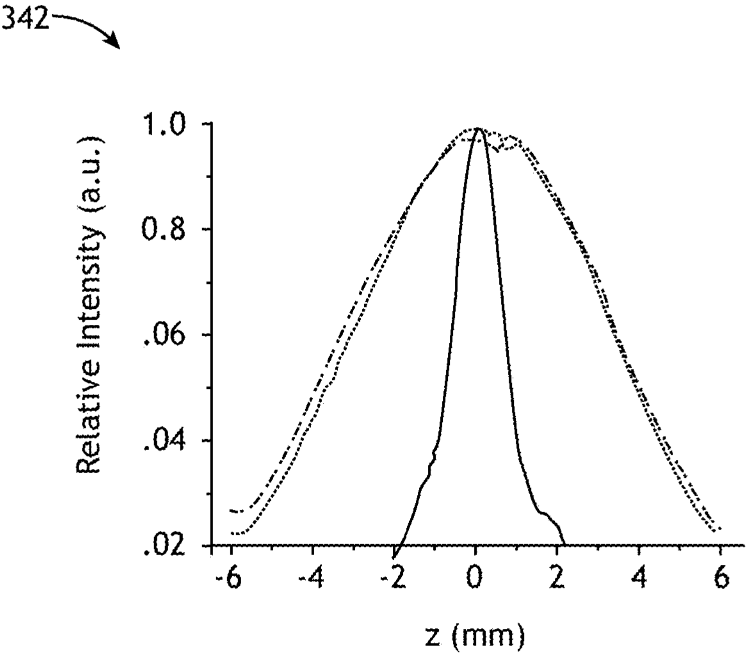
FIG.3G 344
212
[0.8b-0.38b]
b
a
202
324
226
[λ1λ2λ3...λN]
346
228
348
228
X
y
X
Z
350
FWHM=4.51
1.0
0.8
0.6
0.4
0.2
0.0
-20
-10
0
10
20
x[μm]

352
212
[0.85b-0.43b]
202
324
226
354
228
356
228
X
Y
X
Z
358
FWHM=5.06
1.0
0.8
0.6
0.4
0.2
0.0
-20
-10
0
10
20
x[μm]

360
212
[0.9b-0.48b]
226
202
362
228
X
Y
364
228
X
Z
366
FWHM=5.7
1.0
0.8
0.6
0.4
0.2
0.0
-20
-10
0
10
20
x[µm]

368
212
[0.95b-0.53b]
226
202
370
228
X
Y
372
228
X
Z
374
FWHM=6.2
1.0
0.8
0.6
0.4
0.2
0.0
-20
-10
0
10
20
x[µm]

376
212
a
b
226
378
228
X
Y
380
228
X
Z 382
212
202
384
228
X
Y
386
228
X
Z 388
212
202
226
[0.85b-0.43b]
390
228
X
y
392
228
X
Z

394
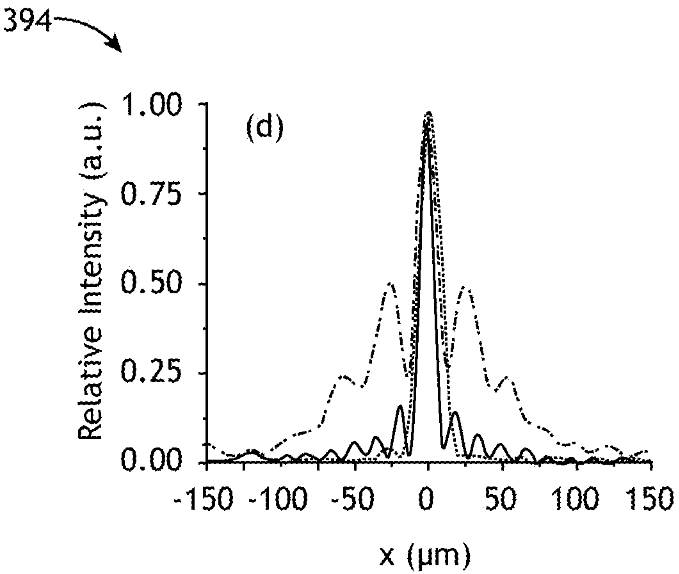
396
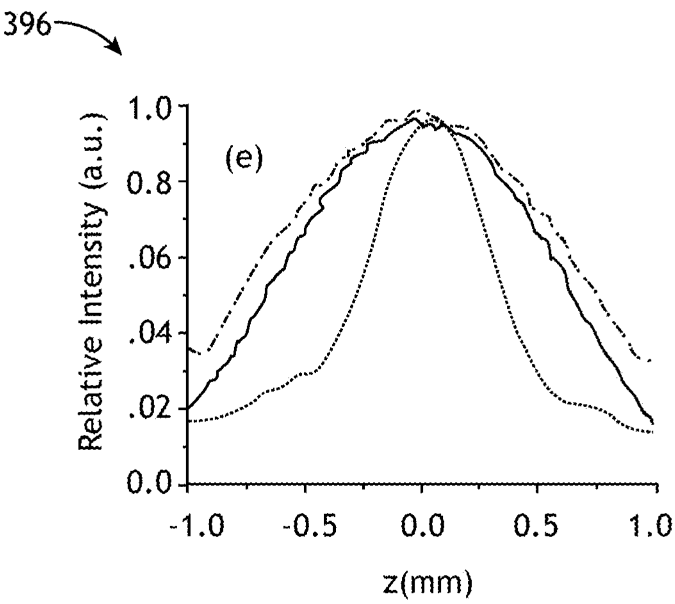
FIG.30

INSTANTANEOUS NON-DIFFRACTING LIGHT SHEETS

CROSS-REFERENCE TO RELATED APPLICATION

The present application claims the benefit under 35 U.S.C. § 119(e) of U.S. Provisional Application Ser. No. 63/013,182, filed Apr. 21, 2020, entitled INSTANTANEOUS NON-DIFFRACTING LIGHT SHEET GENERATION BY CONTROLLING SPATIAL COHERENCE, naming Jialei Tang and Kyu Young Han as inventors, which is incorporated herein by reference in the entirety.

GOVERNMENT LICENSE RIGHTS

This invention was made with Government support under grant numbers U01DK127422 awarded by the National Institutes of Health and 1805200 awarded by the National Science Foundation. The Government has certain rights in this invention.

TECHNICAL FIELD

The present disclosure relates generally to light-sheet generation and, more particularly, to static non-diffracting light-sheet generation.

BACKGROUND

Light sheets formed as two-dimensional distributions of focused light provide excellent illumination profiles for microscopy, particularly microscopy of biological samples. For example, light-sheet fluorescence microscopy (LSFM) illuminates a thin slice of a sample with a light sheet and collects fluorescence emitted orthogonal to the light sheet. This configuration limits illumination to an area of the sample being imaged, which both limits photodamage to sensitive samples and provides precise optical sectioning such that a three-dimensional volume may be imaged by scanning the sample in a direction orthogonal to the light sheet.

However, typical techniques for forming light sheets suffer from small light-sheet dimensions, complex setups requiring precise alignment, or high peak intensities that may induce photodamage. For example, light sheets formed through focusing with a simple cylindrical lens may have limited spatial sizes and weak confinement. By way of another example, light sheets formed using a space-time technique based on manipulation of the phase associated with each spatial frequency in a spatially coherent beam may require a spatial light modulator and extremely precise alignment to achieve desired results, which is unsuitable for many applications. By way of another example, various techniques have been developed for generating light sheets through scanning. For instance, a light sheet may be formed by scanning a beam (e.g., a Gaussian beam, a Bessel beam, an Airy beam, or the like) across a desired light-sheet plane or by a field synthesis technique in which a beam is scanned in a back focal plane (e.g., a pupil plane) of an illumination objective lens to generate a desired light-sheet profile in an imaging plane. However, these scanning-based techniques require high-peak intensities that may induce photodamage in sensitive samples and/or require sophisticated moving components, which may limit the applicability of such techniques.

There is therefore a need to develop systems and methods for the development of light sheets.

SUMMARY

An illumination system is disclosed in accordance with one or more illustrative embodiments of the present disclosure. In one illustrative embodiment, the system includes an illumination source. In another illustrative embodiment, the system includes a line-projection system configured to simultaneously illuminate a pupil plane with a static distribution of a plurality of one-dimensional (1D) coherent beams including illumination from the illumination source. In another illustrative embodiment, each of the 1D coherent beams of the plurality of 1D coherent beams extends lengthwise along a coherent direction between boundaries of the pupil plane, have a width along an incoherent direction perpendicular to the coherent direction, and are distributed in a parallel distribution along the incoherent direction. In another illustrative embodiment, each of the 1D coherent beams of the plurality of 1D coherent beams is spatially coherent along the coherent direction and spatially incoherent along the incoherent direction. In another illustrative embodiment, the system includes an objective lens configured to form a light sheet in an imaging plane based on an incoherent superposition of the plurality of 1D coherent beams, where the light sheet extends along an optical axis of the objective lens and along a direction corresponding to the incoherent direction, and where the light sheet has a thickness along a direction corresponding to the coherent direction.

An optical measurement device is disclosed in accordance with one or more illustrative embodiments of the present disclosure. In one illustrative embodiment, the system includes an illumination source. In another illustrative embodiment, the system includes an objective lens. In another illustrative embodiment, the system includes a line-projection system configured to simultaneously illuminate a pupil plane associated with the objective lens with a static distribution of a plurality of 1D coherent beams including illumination from the illumination source. In another illustrative embodiment, each of the 1D coherent beams of the plurality of 1D coherent beams extends lengthwise along a coherent direction between boundaries of the pupil plane, have a width along an incoherent direction perpendicular to the coherent direction, and are distributed in a parallel distribution along the incoherent direction. In another illustrative embodiment, each of the 1D coherent beams of the plurality of 1D coherent beams is spatially coherent along the coherent direction and spatially incoherent along the incoherent direction. In another illustrative embodiment, the system includes an objective lens configured to form a light sheet in an imaging plane based on an incoherent superposition of the plurality of 1D coherent beams, where the light sheet extends along an optical axis of the objective lens and along a direction corresponding to the incoherent direction, and where the light sheet has a thickness along a direction corresponding to the coherent direction. In another illustrative embodiment, the system includes a sample stage configured to secure a sample in the imaging plane. In another illustrative embodiment, the system includes a collection objective lens configured to capture light from the sample in response to the light sheet. In another illustrative embodiment, the system includes a detector configured to generate an image of the sample based on the light from the collection objective lens.

A method is disclosed in accordance with one or more illustrative embodiments of the present disclosure. In one illustrative embodiment, the method includes simultaneously illuminating a pupil plane with a static distribution of a plurality of 1D coherent beams including illumination from an illumination source. In another illustrative embodiment, each of the 1D coherent beams of the plurality of 1D coherent beams extends lengthwise along a coherent direction between boundaries of the pupil plane, have a width along an incoherent direction perpendicular to the coherent direction, and are distributed in a parallel distribution along the incoherent direction. In another illustrative embodiment, each of the 1D coherent beams of the plurality of 1D coherent beams is spatially coherent along the coherent direction and spatially incoherent along the incoherent direction. In another illustrative embodiment, the method includes forming a light sheet in an imaging plane with an objective lens based on an incoherent superposition of the plurality of 1D coherent beams, wherein the light sheet extends along an optical axis of the objective lens and along a direction corresponding to the incoherent direction, wherein the light sheet has a thickness along a direction corresponding to the coherent direction.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

FIG. 2D is a conceptual view of a static distribution of 1D coherent beams in an unobstructed pupil plane 212 associated with the light sheet generator configured according to FIGS. 2A and 2B, in accordance with one or more embodiments of the present disclosure.

FIG. 2K includes a top view of a pupil plane including an annular pupil mask as illustrated in FIG. 2J but uniformly illuminated with fully coherent illumination to form a traditional Bessel beam, along with first and second plots of the resulting intensity profile of the Bessel beam, in accordance with one or more embodiments of the present disclosure.

FIG. 2L includes first and second plots of the resulting intensity profile of the Bessel light sheet generated using a traditional scanning-based field synthesis technique, in accordance with one or more embodiments of the present disclosure.

FIG. 2M includes a first and a second plot of the intensity profiles of the traditional Bessel beam, the Gaussian light sheet, the instantaneous Bessel light sheet, and the scanning Bessel light sheet for direct comparison along the Y and Z directions, respectively, in accordance with one or more embodiments of the present disclosure.

FIG. 2N is a plot of the intensity profile of the instantaneous Bessel light sheet as a function of the slit width along the Y direction, in accordance with one or more embodiments of the present disclosure.

FIG. 2O includes first and second plots of the intensity profile of an instantaneous Bessel light sheet formed with a diode laser with spatial coherence reduced with a speckle reducer as the spatially-incoherent illumination source, in accordance with one or more embodiments of the present disclosure.

FIG. 3G includes first and second plots of the intensity distributions of FIGS. 3D-3F along the X and Z directions for direct comparison, in accordance with one or more embodiments of the present disclosure.

FIG. 3O includes a first and a second plot of the intensity profiles associated with FIGS. 3L-3O along the X and Z directions, in accordance with one or more embodiments of the present disclosure.

DETAILED DESCRIPTION

Figure 1:
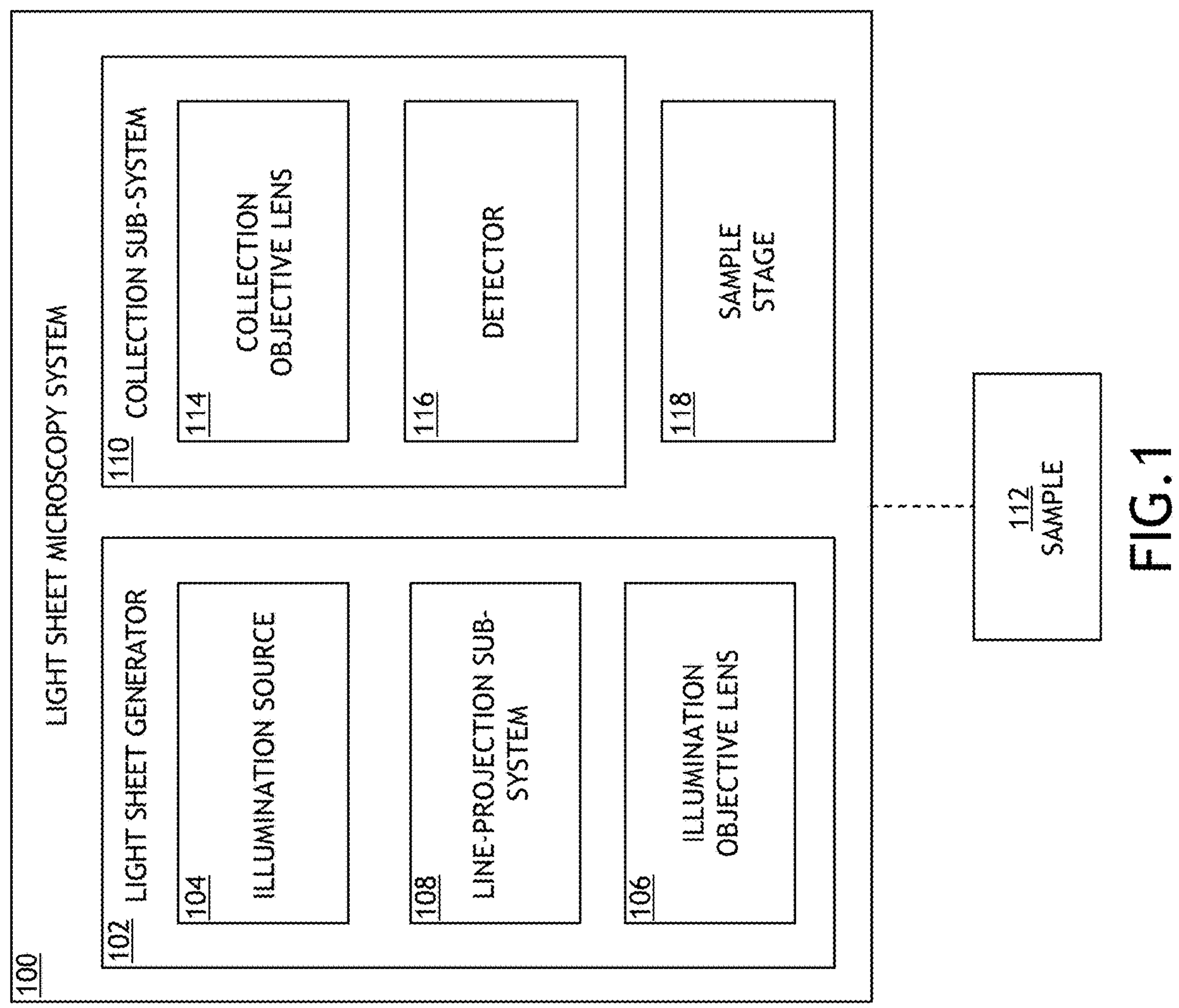
FIG. 1 is a block diagram view of a light sheet microscopy system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for the generation of instantaneous light sheets based on an incoherent superposition of one-dimensional (1D) coherent beams in an image plane of an illumination objective lens. For the purposes of the present disclosure, a 1D coherent beam is light having a linear beam profile with a length along a coherent direction and a width along an incoherent direction orthogonal to the coherent direction, where the length is substantially greater than the width. In some embodiments, a static (e.g., non-scanning) distribution of parallel 1D coherent beams is formed at a pupil plane (e.g., a back focal plane of the illumination objective lens or a conjugate thereof). For example, the parallel 1D coherent beams may be distributed along the incoherent direction in the pupil plane. In this configuration, the illumination objective lens may operate as a Fourier operator and the 1D coherent beams may be incoherently superposed at the image plane of the illumination objective lens to form a light sheet.

It is contemplated herein that an incoherent superposition of a static distribution of 1D coherent beams may be governed by the field synthesis theorem. However, unlike existing field-synthesis techniques that require scanning beams in the pupil plane, the systems and methods disclosed herein utilize a static distribution of light in the pupil plane. As a result, light sheets may be formed instantaneously and may avoid high peak intensities associated with scanning-based approaches. Further, the systems and methods disclosed herein for instantaneous light sheet formation may be suitable for the generation of light sheets with any temporal profile including a pulsed light sheet formed in a single shot or a continuous-wave light sheet.

A static distribution of 1D coherent beams may be generated using a variety of techniques within the spirit and scope of the present disclosure.

In some embodiments, a static distribution of 1D coherent beams is formed with a line-projection system including an extended spatially incoherent light source, a cylindrical lens, and a slit aperture. In this configuration, spatial coherence along a linear direction (e.g., the coherent direction) is achieved via the slit aperture. Further, light from various locations of the extended spatially incoherent illumination source along a direction orthogonal to the slit (e.g., the incoherent direction) may also pass through the slit aperture to form a series of 1D coherent beams that are each coherent along the coherent direction but incoherent with respect to each other since each is associated with a different location of the extended spatially incoherent illumination source.

Any desired spatially-incoherent illumination source may be used including, but not limited to, a light-emitting diode (LED) or a coherent light source (e.g., a laser diode) coupled with a speckle reducer to reduce or eliminate the spatial coherence. Further, light from multiple illumination sources, possibly with different spectra, may be combined along a common optical path prior to the line-projection system to simultaneously generate multiple light sheets.

In some embodiments, a static distribution of 1D coherent beams is formed with a line-projection system including a spatially-coherent polychromatic light source, a dispersive optical element (e.g., a diffraction grating, a prism, or the like), and a cylindrical lens. For example, the dispersive optical element and the cylindrical lens may be aligned to generate a series of 1D coherent beams, each with a different wavelength. In this configuration, the dispersion and line focusing of the polychromatic breaks the coherence of the illumination from the polychromatic source along the dispersion direction (e.g., the incoherent direction), though coherence along the orthogonal direction (e.g., the incoherent direction) is maintained. Any desired spatially-coherent illumination source may be used including, but not limited to, a diode laser, a supercontinuum laser, or a super-luminescent diode.

It is further contemplated herein that a variety of types of instantaneous light sheets may be formed using the incoherent superposition of a static distribution of 1D coherent beams as disclosed herein. In some embodiments, a Gaussian light sheet is formed when the pupil plane is not obscured, the lengths of the 1D coherent beams fully extend at least to the boundaries of the pupil plane, and the 1D coherent beams are spaced along the full extent of the pupil along the incoherent direction.

In some embodiments, the pupil plane includes a pupil mask to spatially modify the intensity and/or phase of the static distribution of 1D coherent beams. In such configurations, the pupil mask may be in a relayed or conjugate instance of the back focal plane of the objective. Further, such a configuration may be suitable for a variety of types of light sheets. For example, a Bessel light sheet may be formed with a mask including an annular aperture (or a central obscuration to effectively provide an annular aperture), where the lengths of the 1D coherent beams fully extend at least to the boundaries of the pupil plane along the coherent direction and are spaced along the full extent of the pupil along the incoherent direction. This configuration is thus similar to the configuration for a Gaussian light sheet, but further includes the annular pupil mask. By way of another example, a C light sheet may be formed with an annular mask similar to that used to generate a Bessel beam, but where the 1D coherent beams are present in only selected portions of the pupil plane along the incoherent direction. Additionally, various aspects of a C light sheet may be controlled or adjusted by adjusting the particular distribution of the 1D coherent beams across the pupil plane in the incoherent direction.

Additional embodiments of the present disclosure are directed to a microscopy system that illuminates a sample with one or more light sheets. In some embodiments, a microscopy system includes a light sheet fluorescence microscope (LSFM) that illuminates a sample with one or more light sheets and collects emitted fluorescence from the sample along a direction orthogonal to the light sheets.

Referring now to FIGS. 1A-4, systems and methods for generating light sheets are described in greater detail, in accordance with one or more embodiments of the present disclosure.

FIG. 1 is a block diagram view of a light sheet microscopy system 100, in accordance with one or more embodiments of the present disclosure.

In one embodiment, the light sheet microscopy system 100 includes a light sheet generator 102 to generate one or more light sheets. For example, the light sheet generator 102 may include at least one illumination source 104, an illumination objective lens 106, and a line-projection sub-system 108 to generate a static distribution of 1D coherent beams in a pupil plane associated with the illumination objective lens 106. In another embodiment, the light sheet microscopy system 100 includes a collection sub-system 110 to collect light from a sample 112 in response to a light sheet. For example, the collection sub-system 110 may include a collection objective lens 114 to collect light from the sample 112 and a detector 116 to capture at least a portion of the light collected by the collection objective lens 114 for a measurement. The collection sub-system 110 may generally collect light from the sample 112 from any orientation with respect to the light sheet 204. In one embodiment, the collection sub-system 110 collects light from the sample 112 from a direction orthogonal to the light sheet 204 (e.g., in a direction associated with a thickness of the light sheet 204), which may be orthogonal to the direction of the illumination 222 forming the light sheet 204. In this way, the slice of the sample 112 illuminated by the light sheet 204 may be visible to the collection sub-system 110.

The detector 116 may include any type of detector known in the art suitable for generating a measurement signal associated with light emanating from the sample 112. For example, the detector 116 may include, but is not limited to, a charge-coupled device (CCD) detector, complementary metal-oxide-semiconductor (CMOS) detector, or one or more photodiodes. By way of another example, the detector 116 may include a sensor suitable for capturing data from the sample 112 as the sample 112 is in motion such as, but not limited to, a line-scan sensor. In another embodiment, the detector 116 may include a spectroscopic sensor suitable for identifying wavelengths of light emanating from the sample 112.

Additionally, it is to be understood that the light sheet microscopy system 100, or various components thereof such as, but not limited to, the light sheet generator 102 or the collection sub-system 110 may include various optical components to direct and/or manipulate light within the light sheet microscopy system 100. For example, the light sheet microscopy system 100 may include one or more spatial filters, one or more spectral filters, one or more polarizers, one or more beamsplitters, one or more beam combiners, one or more homogenizers, one or more beam expanders, one or more beam combiners, one or more beam collimators, or one or more mirrors. By way of another example, the light sheet microscopy system 100 may include one or more optical relays or projection lenses to relay or otherwise image a particular optical plane (e.g., a pupil plane) to a convenient location. In this way, various components such as those listed above may be provided at any suitable location.

The light sheet microscopy system 100 may operate as any type of microscopy system known in the art. In one embodiment, the light sheet microscopy system 100 operates as a light sheet fluorescence microscope (LSFM). For example, a light sheet may be formed using one or more wavelengths associated with an absorption band of a fluorophore in the sample 112 to induce fluorescence of the sample 112 when illuminated by the light sheet. Further, the collection sub-system 110 may include a spectral filter to block wavelengths associated with the light sheet and pass wavelengths associated with the fluorescence of the sample 112.

In another embodiment, the light sheet microscopy system 100 includes a sample stage 118 to secure a sample 112 and further position the sample 112 with respect to a light sheet. For example, the sample stage 118 may include one or more actuators to translate the sample 112 to various selected positions with respect to a light sheet. In this way, the light sheet microscopy system 100 may capture images of the sample 112 at multiple locations in the sample. In one embodiment, the detector 116 is configured to capture images of the sample 112 as the sample 112 is translated along a direction orthogonal to the light sheet by the sample stage 118. Such images may then form, or be combined to form, a three-dimensional (3D) depiction of the sample 112.

Figures 2A, 2B:
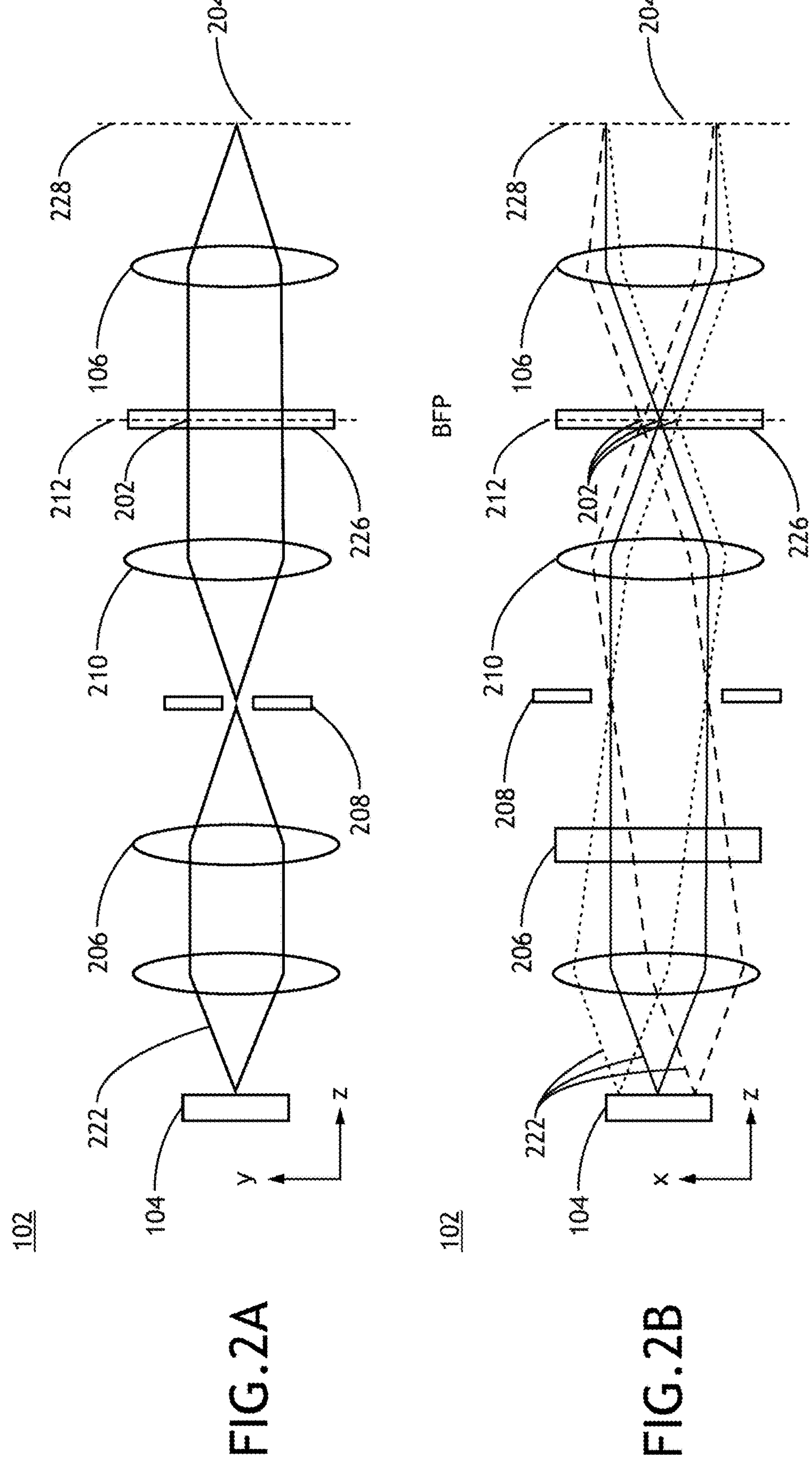
FIG. 2A is a first schematic view of the light sheet generator including a spatially-incoherent illumination source from a first perspective, in accordance with one or more embodiments of the present disclosure.
FIG. 2B is a second schematic view of the light sheet generator including a spatially-incoherent illumination source from a second perspective orthogonal to the first perspective, in accordance with one or more embodiments of the present disclosure.

Referring now to FIGS. 2A-3O, the light sheet generator 102 is described in greater detail, in accordance with one or more embodiments of the present disclosure. It is contemplated herein that a static distribution of 1D coherent beams 202 suitable for generating a light sheet 204 may be formed in various ways. FIGS. 2A-2P illustrate nonlimiting embodiments for the formation of a light sheet 204 using a spatially-incoherent illumination source 104 and FIGS. 3A-30 illustrate non-limiting embodiments for the formation of a light sheet 204 with a spatially-coherent polychromatic illumination source 104.

FIG. 2A is a first schematic view of the light sheet generator 102 including a spatially-incoherent illumination source 104 from a first perspective, in accordance with one or more embodiments of the present disclosure. FIG. 2B is a second schematic view of the light sheet generator 102 including a spatially-incoherent illumination source 104 from a second perspective orthogonal to the first perspective, in accordance with one or more embodiments of the present disclosure.

In one embodiment, the light sheet generator 102 includes a cylindrical lens 206, a slit aperture 208, and a projection lens 210 aligned to generate a static distribution of parallel 1D coherent beams 202 on a pupil plane 212, where the pupil plane 212 may correspond to a back focal plane (BFP) of the illumination objective lens 106 or a relayed (e.g., conjugate) instance of the BFP. For example, although not shown, the light sheet microscopy system 100 may include an optical relay to provide a relayed instance of the BFP.

Figure 2C:
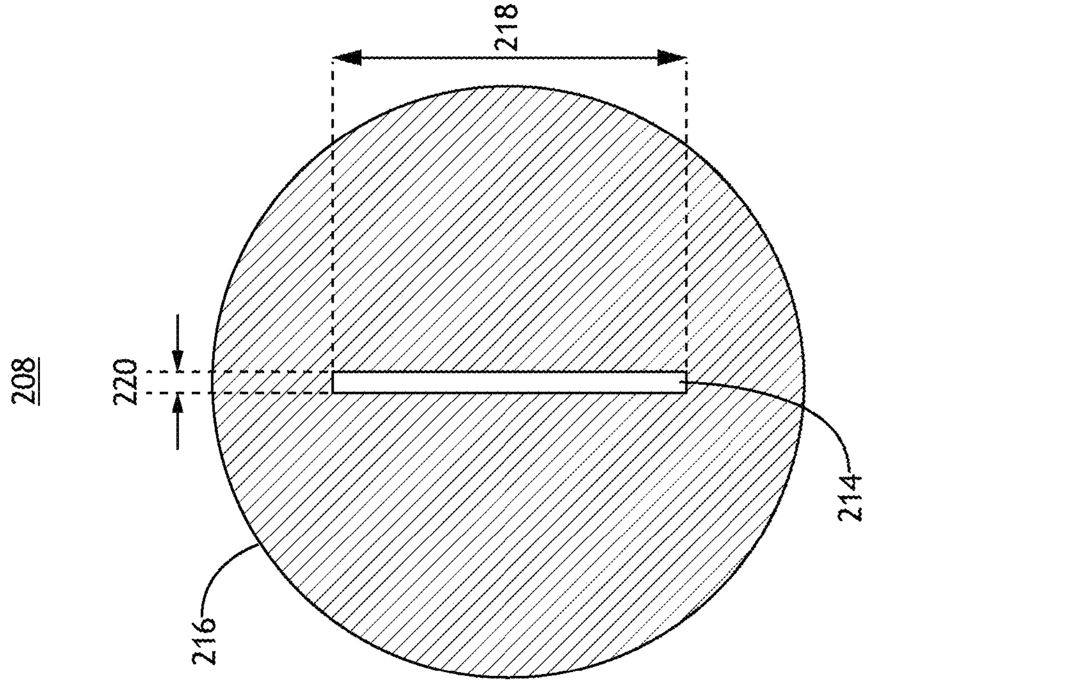
FIG. 2C is a top view of the slit aperture, in accordance with one or more embodiments of the present disclosure.

FIG. 2C is a top view of the slit aperture 208, in accordance with one or more embodiments of the present disclosure. In one embodiment, the slit aperture 208 includes a linear opening 214 in a blocking material 216 characterized by a slit length 218 and a slit width 220.

In one embodiment, the slit aperture 208 is located at a focal plane of the cylindrical lens 206 and aligned such that the slit length 218 is aligned with a line-focus direction of the cylindrical lens 206. For example, in FIGS. 2A and 2B, the cylindrical lens 206 has a nonzero focusing power for light in the Y-Z plane and zero focusing power for light in the X-Z plane, and the slit aperture 208 is aligned such that the slit length 218 lies along the X direction. In this configuration, only illumination 222 from a single linear strip of the spatially-incoherent illumination source 104 along the X direction may pass through the slit aperture 208 and be directed to the pupil plane 212 by the projection lens 210 as illustrated in FIG. 2A. The illumination 222 from any given point of the spatially-incoherent illumination source 104 along this linear strip will be focused at the pupil plane 212 as a 1D coherent beam 202 with a length along the Y direction and a width along the X direction. Further, the illumination 222 from various points of the spatially-incoherent illumination source 104 along the X direction will be focused to different locations at the pupil plane 212 along the X direction as illustrated in FIG. 2B.

FIG. 2D is a conceptual view of a static distribution of 1D coherent beams 202 in an unobstructed pupil plane 212 associated with the light sheet generator 102 configured according to FIGS. 2A and 2B, in accordance with one or more embodiments of the present disclosure. It is contemplated herein that a particular 1D coherent beam 202 will be formed from light from a single location of the spatially-incoherent illumination source 104 such that light within each 1D coherent beam 202 is spatially coherent. However, since each 1D coherent beam 202 includes light from a different location of the spatially-incoherent illumination source 104, the 1D coherent beams 202 are incoherent with respect to each other. Thus, in FIGS. 2A and 2B, the Y direction corresponds to a coherent direction and the X direction corresponds to an incoherent direction. Further, although FIG. 2D illustrates the 1D coherent beams 202 as separated beams, it is contemplated herein that the 1D coherent beams 202 may fill the entire pupil plane 212 along the incoherent direction. In this way, the pupil plane 212 may be filled with virtual 1D coherent beams 202 associated with illumination 222 from a continuous linear portion of the spatially-incoherent illumination source 104.

Additionally, FIG. 2D illustrates a configuration in which the 1D coherent beams 202 fully span the pupil-plane boundary 224 in both the coherent and incoherent directions (e.g., here the Y and X directions, respectively). However, as will be described in greater detail throughout, the 1D coherent beams 202 may generally have any desired distribution. Further, tailoring the distribution of a light sheet 204 may be achieved by tailoring various aspects of the distribution of the 1D coherent beams 202 in the pupil plane 212.

In some embodiments, the light sheet generator 102 includes a pupil mask 226 (e.g., an intensity mask and/or a phase mask) at the pupil plane 212 to selectively control various aspects of the 1D coherent beams 202 from propagating to the illumination objective lens 106. In this way, various aspects of a generated light sheet 204 may be manipulated. In one embodiment, the pupil mask 226 includes an annular aperture, which may be suitable for generating various non-diffracting light sheets 204 such as, but not limited to, Bessel or C light sheets 204. Such an annular aperture may be formed using various techniques including, but not limited to, a blocking material having an open annular aperture or a central obscuration where an annular aperture is effectively formed between an edge of the central obscuration and a boundary of the pupil plane (e.g., associated with a design of various elements in the light sheet microscopy system 100).

Referring again to FIGS. 2A and 2B, the illumination objective lens 106 may then receive the illumination 222 from the pupil (e.g., the static distribution of 1D coherent beams 202) and direct the illumination 222 to an image plane 228 to form the light sheet 204. In particular, since the 1D coherent beams 202 are incoherent with respect to each other, they will be incoherently superposed at the image plane 228 such that the respective intensity distributions are simply summed at the image plane 228.

Figure 2F:
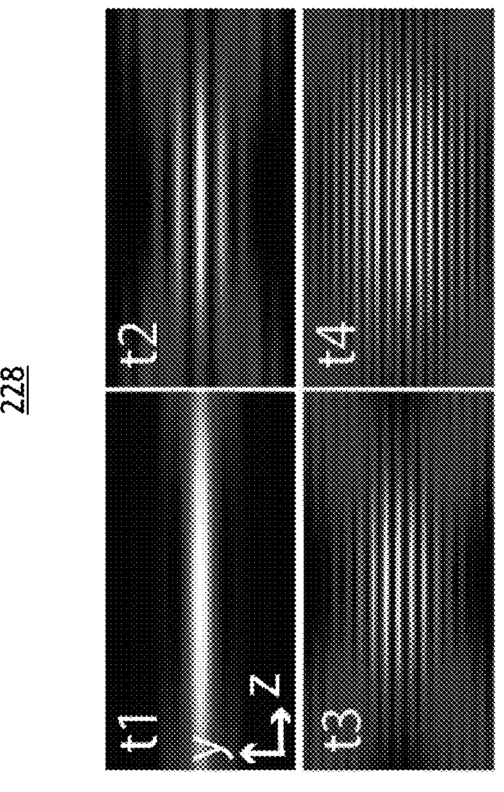
FIG. 2F is a series of simulated plots of corresponding intensity profiles of the four exemplary 1D coherent beams of FIG. 2E at the image plane, in accordance with one or more embodiments of the present disclosure.
Figure 2E:
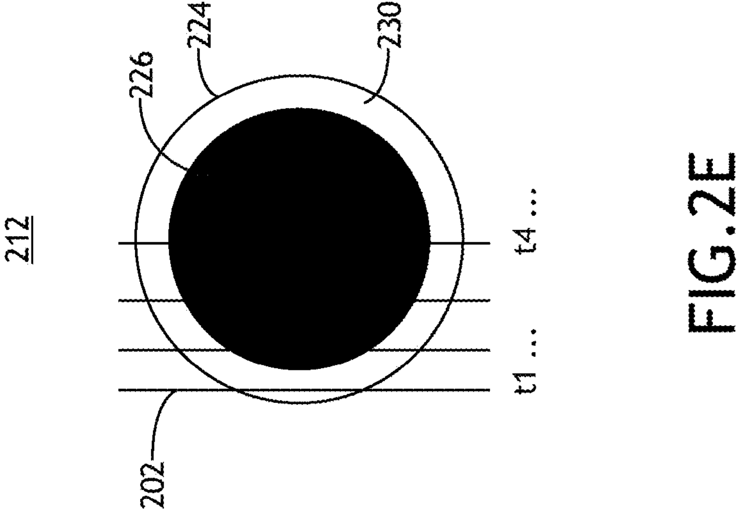
FIG. 2E is top view of a pupil plane including a pupil mask with an annular aperture, along with four exemplary 1D coherent beams, in accordance with one or more embodiments of the present disclosure.
Figure 2H:
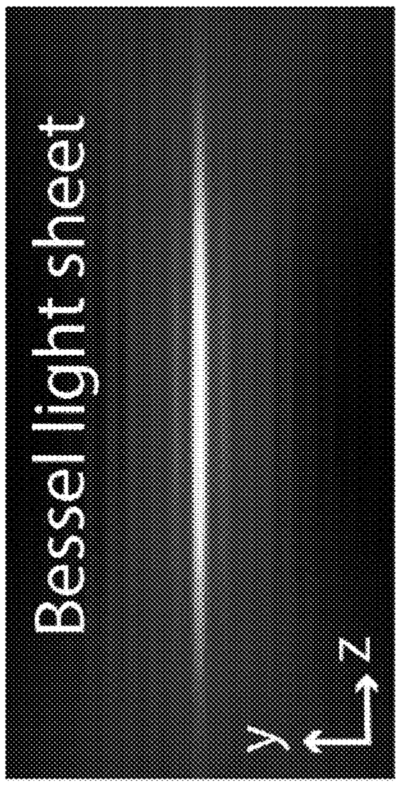
FIG. 2H is a simulated plot of the corresponding intensity profile of a Bessel light sheet based on the static distribution of 1D coherent beams and pupil mask in FIG. 2G, in accordance with one or more embodiments of the present disclosure.
Figure 2G:
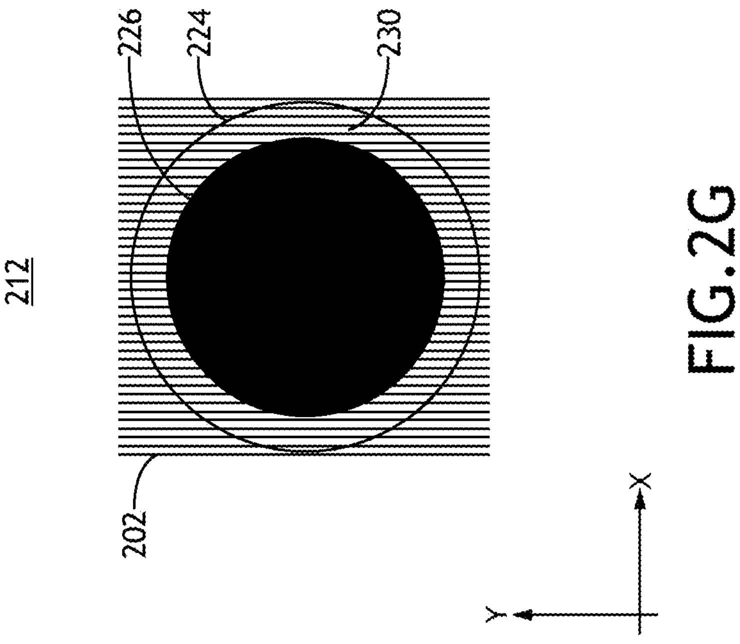
FIG. 2G is a top view of a pupil plane including a static distribution of 1D coherent beams that fully spans the pupil-plane boundary in both the coherent and incoherent directions, in accordance with one or more embodiments of the present disclosure.

In the configuration illustrated in FIGS. 2A and 2B, the illumination objective lens 106 will operate as a Fourier operator such that the field at the image plane 228 may correspond to a Fourier transform of the field at the pupil plane 212. For example, FIGS. 2E-2G illustrate the formation of a light sheet 204, in accordance with one or more embodiments of the present disclosure. FIG. 2E is top view of a pupil plane 212 including a pupil mask 226 with an annular aperture 230, along with four exemplary 1D coherent beams 202 (labeled t1-t4), in accordance with one or more embodiments of the present disclosure. FIG. 2F is a series of simulated plots of corresponding intensity profiles of the four exemplary 1D coherent beams 202 t1-t4 of FIG. 2E at the image plane 228, in accordance with one or more embodiments of the present disclosure. FIG. 2G is a top FIG view of a pupil plane 212 including a static distribution of 1D coherent beams 202 that fully spans the pupil-plane boundary 224 in both the coherent and incoherent directions, in accordance with one or more embodiments of the present disclosure. FIG. 2H is a simulated plot of the corresponding intensity profile of a Bessel light sheet 204 based on the static distribution of 1D coherent beams 202 and pupil mask 226 in FIG. 2G, in accordance with one or more embodiments of the present disclosure.

As illustrated in FIGS. 2E-2H, the intensity profile of the light sheet 204 (e.g., FIG. 2G) will correspond to an incoherent summation of the intensity profiles of the associated 1D coherent beams 202 as modified by the pupil mask 226. It is contemplated herein that a static distribution of 1D coherent beams 202 as disclosed herein may provide the same light-sheet distribution as a time-averaged light-sheet generated by scanning a single 1D coherent beam across the pupil plane 212 using a typical scanning-based field synthesis technique. For instance, a scanning-based field synthesis technique may sequentially scan a single 1D coherent beam 202 across the pupil plane 212 to sequentially generate the intensity profiles shown in FIG. 2F. However, the static distribution of 1D coherent beams 202 as disclosed herein provides multiple benefits over the scanning-based approach. For example, the static distribution of 1D coherent beams 202 as disclosed herein generates an instantaneous light sheet 204 (e.g., FIG. 2G) without the need for any time averaging. Such an instantaneous light sheet 204 may thus be generated in a single shot with a single pulse of illumination 222 or by continuous-wave illumination 222. Further, eliminating the need for time averaging may allow for substantially faster imaging speeds than the scanning-based field-synthesis technique. By way of another example, the static distribution of 1D coherent beams 202 as disclosed herein provides substantially lower intensities than the scanning-based light sheet techniques, which reduces the risk of photodamage and allows for increased power without damaging a sensitive sample 112.

Referring now to FIGS. 2I-2P, experimental demonstrations of the formation of various types of light sheets 204 using the configuration illustrated in FIGS. 2A and 2B are described, in accordance with one or more embodiments of the present disclosure. In FIGS. 2I-2P, incoherent illumination 222 from a LED ($\lambda$=625 nm) operating as the spatially-incoherent illumination source 104, was collected and collimated by a line-projection sub-system 108, which included a condenser F1 ($f_1$=20 mm) and a cylindrical lens 206 CL ($f_{CL}$=25 mm). The illumination 222 then passed through a slit aperture 208 with a slit width 220 of 10 μm placed at the BFP of the cylindrical lens 206 to control the spatial coherence. The slit aperture 208 was then conjugated to the image plane 228 using a relay system composed of a lens F2 ($f_2$=50 mm) and the illumination objective lens 106 F3 ($f_3$=40 mm).

Figures 2I, 2J:
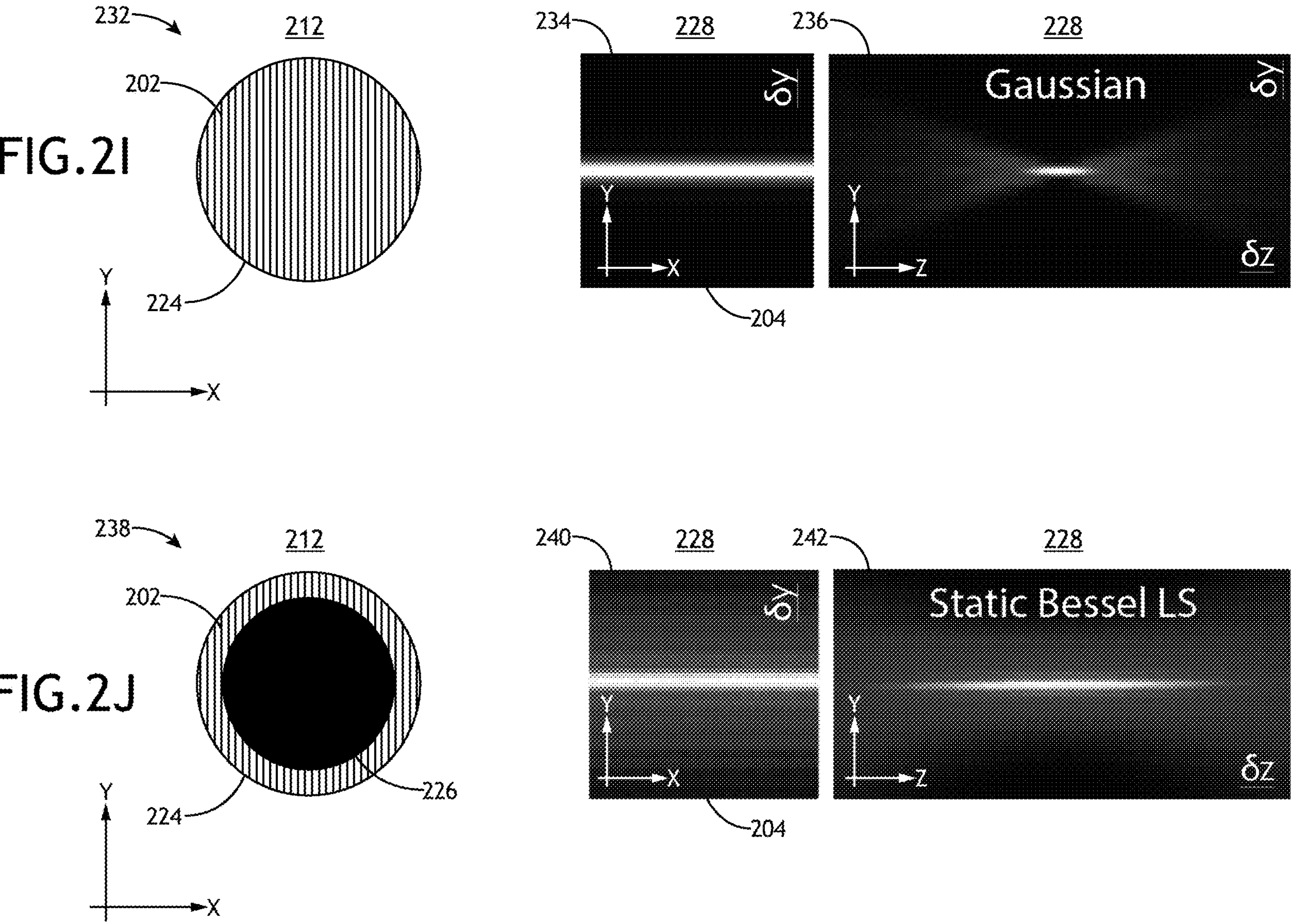
FIG. 2I includes a top view of a pupil plane illustrating a static distribution of 1D coherent beams across an unobstructed pupil plane for the formation of a Gaussian light sheet, along with first and second plots of the resulting intensity profile of the Gaussian light sheet, in accordance with one or more embodiments of the present disclosure.
FIG. 2J includes a top view of a pupil plane illustrating a static distribution of 1D coherent beams across a pupil plane with an annular pupil mask for the formation of a Bessel light sheet, along with first and second plots of the resulting intensity profile of the Bessel light sheet, in accordance with one or more embodiments of the present disclosure.
Figure 20:
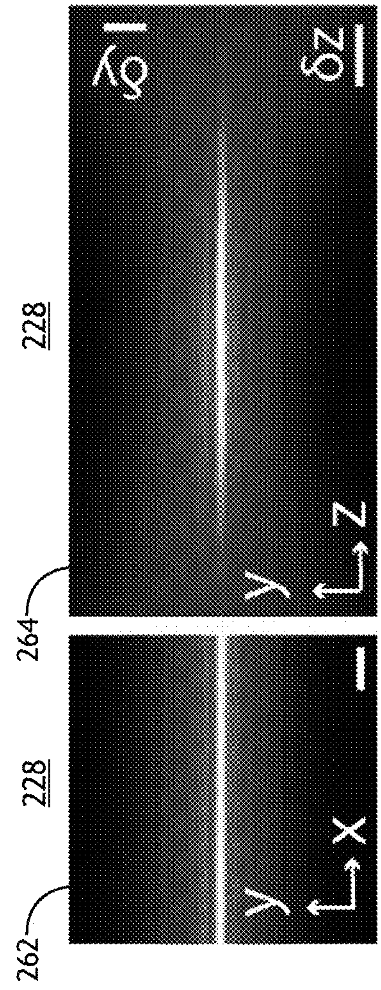

FIG. 2I includes a top view 232 of a pupil plane 212 illustrating a static distribution of 1D coherent beams 202 across an unobstructed pupil plane 212 for the formation of a Gaussian light sheet 204, along with first 234 and second 236 plots of the resulting intensity profile of the Gaussian light sheet 204, in accordance with one or more embodiments of the present disclosure. FIG. 2J includes a top view 238 of a pupil plane 212 illustrating a static distribution of 1D coherent beams 202 across a pupil plane 212 with an annular pupil mask 226 for the formation of a Bessel light sheet 204, along with first 240 and second 242 plots of the resulting intensity profile of the Bessel light sheet 204, in accordance with one or more embodiments of the present disclosure. In particular, pupil mask 226 included an annular ring with outer ($d_1$) and inner ($d_2$) diameters of 2 mm and 1.75 mm, respectively.

As a comparison, FIGS. 2K and 2L illustrate intensity profiles of a traditional Bessel beam and a Bessel light sheet formed using a scanning field-synthesis approach. FIG. 2K includes a top view 244 of a pupil plane 212 including an annular pupil mask 226 as illustrated in FIG. 2J but uniformly illuminated with fully coherent illumination 222 to form a traditional Bessel beam, along with first 246 and second 248 plots of the resulting intensity profile of the Bessel beam, in accordance with one or more embodiments of the present disclosure. FIG. 2L includes first 250 and second 252 plots of the resulting intensity profile of the Bessel light sheet 204 generated using a traditional scanning-based field synthesis technique, in accordance with one or more embodiments of the present disclosure.

In FIGS. 2K and 2L, the illumination source 104 included a diode laser having a wavelength of 638 nm that was spatially filtered by a single mode fiber. The scale bars are $\delta y$=40 μm and $\delta z$=1 mm. The propagation length at the full width at half maximum (FWHM) of the Bessel beam in FIG. 2K was 6.90 mm, which was about 6 times longer than that of a Gaussian light sheet 204 (e.g., FIG. 2I) with a similar thickness. In contrast, the instantaneous Bessel light sheet 204 (e.g., FIG. 2J) and the scanning Bessel light sheet 204 (e.g., FIG. 2L) exhibited a propagation length of 6.75 mm and the beam thickness was ~14.5 μm.

FIG. 2M includes a first 254 and a second 256 plot of the intensity profiles of the traditional Bessel beam, the Gaussian light sheet 204, the instantaneous Bessel light sheet 204, and the scanning Bessel light sheet 204 for direct comparison along the Y and Z directions, respectively, in accordance with one or more embodiments of the present disclosure.

It is further contemplated herein that various aspects of a light sheet 204 may be adjusted by controlling various aspects of either the slit aperture 208 or the pupil mask 226. For example, increasing the ratio of the outer diameter to the inner diameter of the annular aperture 230 may increase the propagation length, but may induce relatively larger side-lobes. By way of another example, the slit width 220 may be used to control the degree of spatial coherence. FIG. 2N is a plot 258 of the intensity profile of the instantaneous Bessel light sheet 204 (e.g., FIG. 2J) as a function of the slit width 220 along the Y direction, in accordance with one or more embodiments of the present disclosure. The inset 260 in FIG. 2N includes a plot of the intensity profile of the Bessel light sheet 204 at a slit width 220 of 25 μm in the Y-Z plane. As the slit width 220 increased from 10 μm to 40 μm, the thickness of the light sheet 204 increased by 3.4-fold and the side-lobe fringes faded while the propagation length remained almost constant. The spatial coherence radius ($\rho_c$) at the BFP can generally be approximated as $\rho_c=\lambda f_2/D$=3.1 mm, which ensured large spatial coherence along the Y-axis with the annular pupil mask 226 and the 10 μm slit width 220.

Referring again generally to FIGS. 2A and 2B, the spatially-incoherent illumination source 104 may include any type of spatially-incoherent source known in the art. In one embodiment, as described with respect to FIGS. 2I-2N above, the spatially-incoherent illumination source 104 includes a naturally spatially incoherent source such as, but not limited to, a LED or a lamp source. In another embodiment, the spatially-incoherent illumination source 104 includes a coherent source such as, but not limited to, a laser diode coupled with a speckle reducer or other component to reduce or eliminate the spatial coherence of the associated illumination 222.

FIG. 2O includes first 262 and second 264 plots of the intensity profile of an instantaneous Bessel light sheet 204 formed with a diode laser (λ=638 nm) with spatial coherence reduced with a speckle reducer as the spatially-incoherent illumination source 104, in accordance with one or more embodiments of the present disclosure. In particular, the speckle reducer included a multimode fiber (Ø400 μm) and a fiber shaker to randomize speckle patterns. As illustrated in FIG. 2O, this laser-based approach also generated an instantaneous non-diffracting Bessel light sheet 204] with a negligible speckle pattern.

Figure 2P:
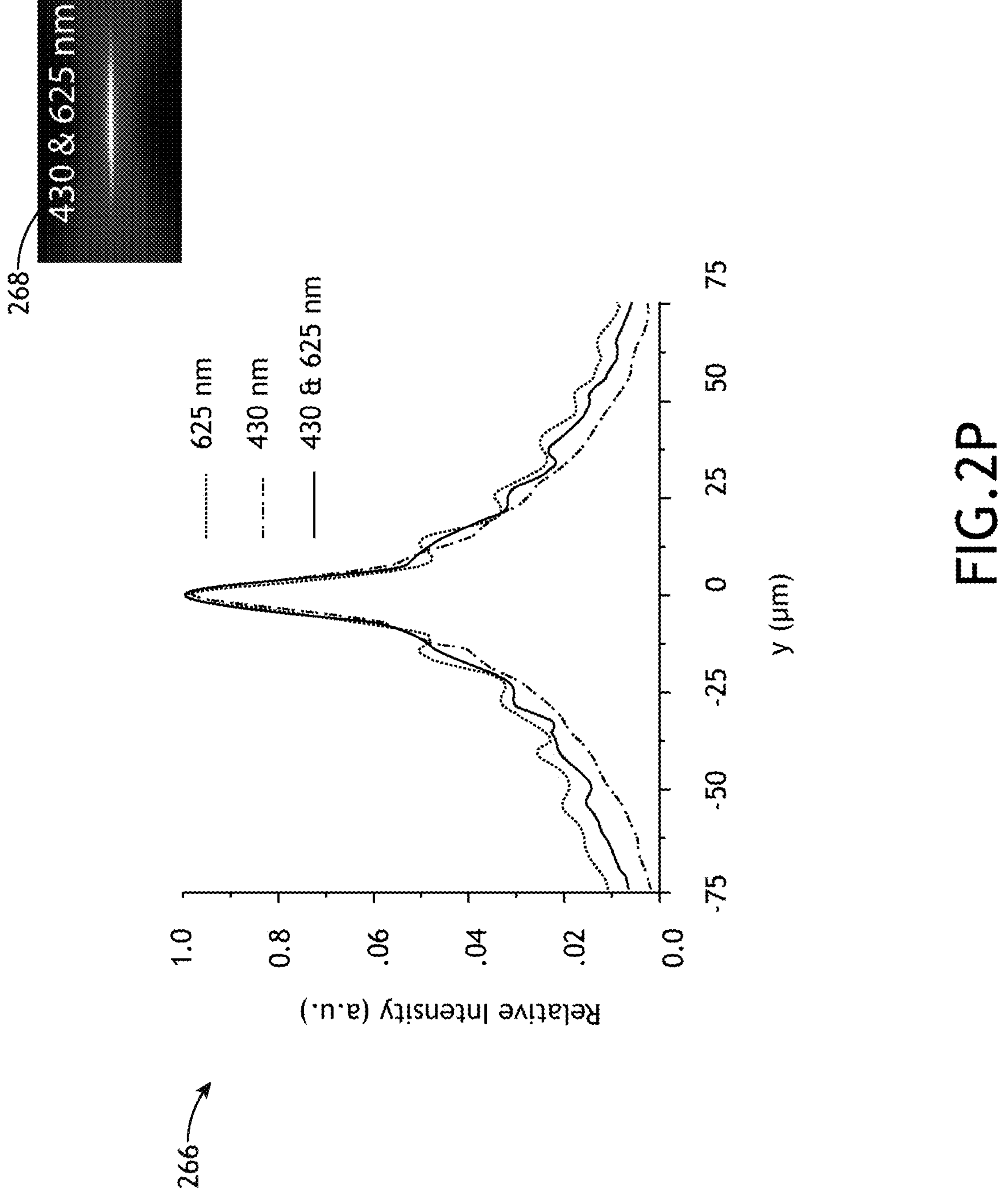
FIG. 2P is a plot illustrating the intensity profile of two simultaneously-generated instantaneous Bessel light sheets at wavelengths of 430 nm and 625 nm based on illumination from two LEDs with these wavelengths, in accordance with one or more embodiments of the present disclosure.

In some embodiments, the light sheet generator 102 includes more than one spatially-incoherent illumination source 104 to simultaneously generate more than one light sheet 204 at the image plane 228. For example, the light sheet generator 102 may include one or more beam combiners (e.g., dichroic beam combiners, or the like) to combine illumination 222 from more than one spatially-incoherent illumination source 104 along a common path prior to entering the line-projection sub-system 108. FIG. 2P is a plot 266 illustrating the intensity profile of two simultaneously-generated instantaneous Bessel light sheets 204 at wavelengths of 430 nm and 625 nm based on illumination 222 from two LEDs with these wavelengths, in accordance with one or more embodiments of the present disclosure. The inset 268 is a plot of the intensity profile of the light sheets 204 in the Y-Z plane. The resulting light sheets 204 were approximately the same beam thickness, while the length of light sheet 204 at 430 nm was slightly shorter than that at 625 nm. The bandwidth of LED used (<20 nm) did not affect the properties of the generated light sheets 204 under the conditions used in this non-limiting example.

Figure 3A:
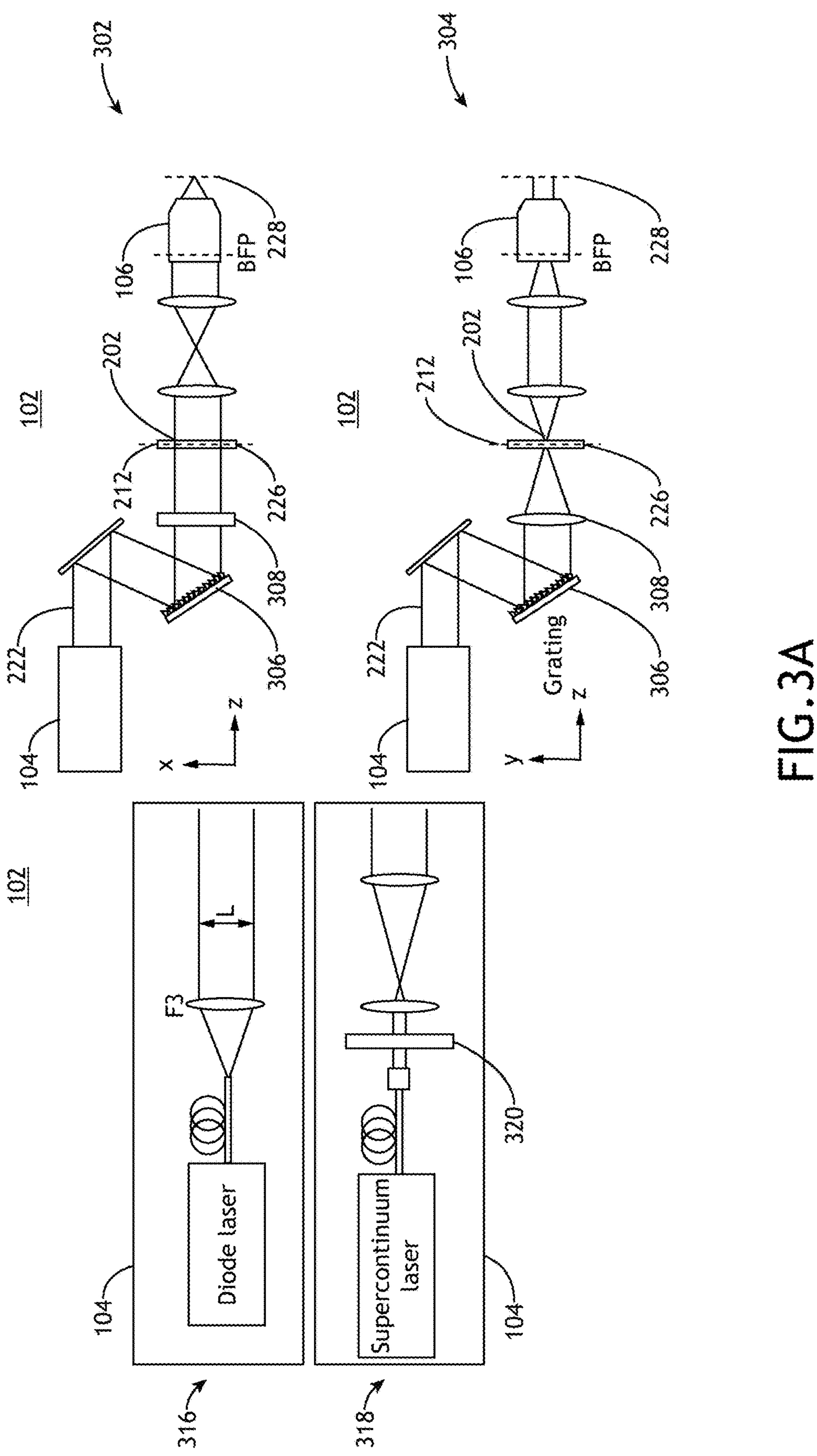
FIG. 3A includes a first perspective and a second perspective of a light sheet microscopy system for the generation of an instantaneous light sheet with a spatially-coherent polychromatic illumination source, in accordance with one or more embodiments of the present disclosure.

Referring now to FIGS. 3A-3O, non-limiting embodiments for the formation of a light sheet 204 with a spatially-coherent polychromatic illumination source 104 are described in greater detail.

FIG. 3A includes a first perspective 302 and a second perspective 304 of a light sheet microscopy system 100 for the generation of an instantaneous light sheet 204 with a spatially-coherent polychromatic illumination source 104, in accordance with one or more embodiments of the present disclosure.

Figure 3B:
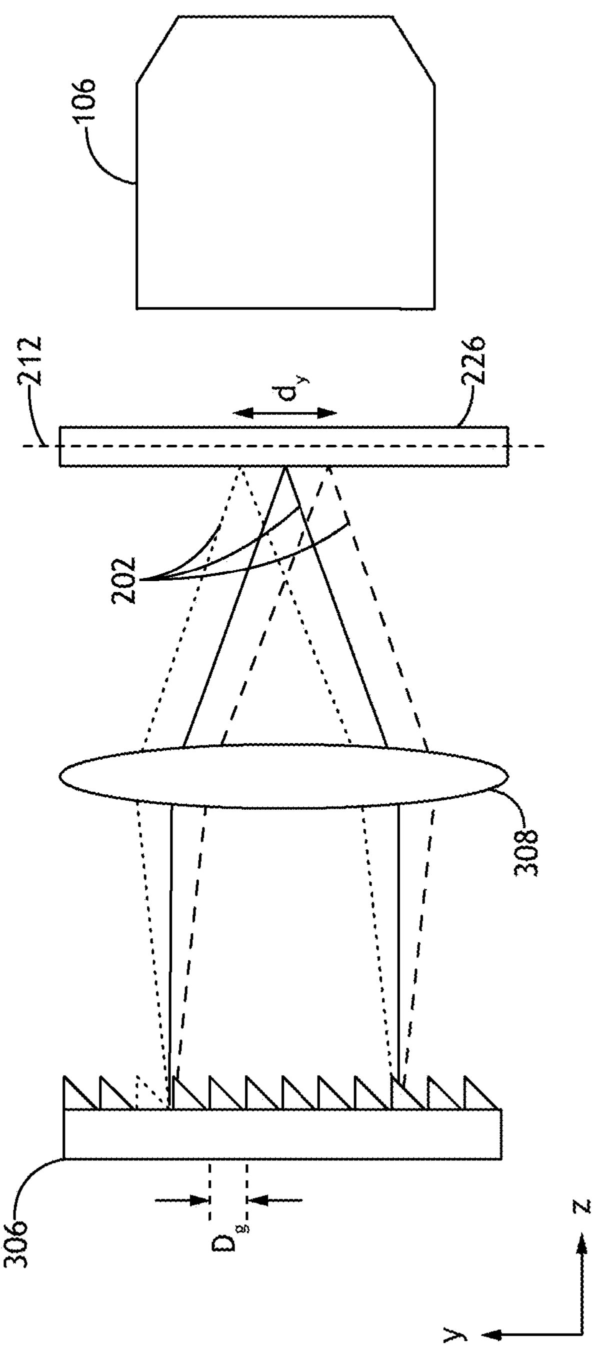
FIG. 3B is a conceptual view illustrating the dispersion of the illumination from a spatially-coherent polychromatic illumination source and the formation of a static distribution of 1D coherent beams, in accordance with one or more embodiments of the present disclosure.

In one embodiment, illumination 222 from a spatially-coherent polychromatic illumination source 104 is directed to a dispersive element 306 (e.g., a diffraction grating, a prism, or the like) which may disperse the polychromatic illumination (e.g., here in the Y direction and in the Y-Z plane) and a cylindrical lens 308 oriented to focus a portion of the illumination 222 associated with each dispersed wavelength to a line focus at a pupil plane 212. In this way, the portion of the illumination 222 associated with each wavelength may be a 1D coherent beam 202. FIG. 3B is a conceptual view illustrating the dispersion of the illumination 222 from a spatially-coherent polychromatic illumination source 104 and the formation of a static distribution of 1D coherent beams 202, in accordance with one or more embodiments of the present disclosure. As illustrated in FIGS. 3A and 3B, the cylindrical lens 308 may have a nonzero focal power along the dispersion direction (here, along the Y direction) and a focal power of zero along an orthogonal direction.

The angular dispersion (Δθ) of the dispersive element 306, represented here as a grating, for a polychromatic beam with the central wavelength $\lambda_0$ and the bandwidth Δλ is described as $$\Delta\theta = \tan\theta\frac{\Delta\lambda}{\lambda_0} \quad (1)$$

$$\theta = \sin^{-1}\left(\frac{\lambda_0}{D_g}\right)$$

where θ is the angle of a first order diffracted beam when the incident illumination 222 is normal to the grating surface and $D_g$ is the space of the grating. The illumination 222 is dispersed at the pupil plane 212 along the Y direction and the amount of geometric dispersion ($d_y$) can be approximated as $$d_y = f_{CL}\Delta\delta \quad (2)$$

where $f_{CL}$ is the focal length of the cylindrical lens 308.

It is contemplated herein that the dispersion of the illumination 222 and sequential line-focusing of each wavelength may break the coherence of the spatially-coherent polychromatic illumination source 104 along the dispersion direction (here, the Y direction), but the coherence may be maintained along the orthogonal direction corresponding to a length of the focused linear beams. As a result, the light associated with each wavelength may form a 1D coherent beam 202 that is spatially coherent along its length. However, the various 1D coherent beams 202 associated with different wavelengths may be spatially incoherent with respect to each other. Accordingly, in FIGS. 3A and 3B, the Y direction may be referred to as the incoherent direction and the X direction may be referred to as the coherent direction.

It is further contemplated herein that the configuration illustrated in FIGS. 3A and 3B may generate a static distribution of parallel 1D coherent beams 202 distributed in the pupil plane 212 along the incoherent direction that is substantially similar to the static distribution of parallel 1D coherent beams 202 distributed in the pupil plane 212 generated by the configuration illustrated in FIGS. 2A and 2B and further illustrated in FIG. 2C. Accordingly, the operation of the illumination objective lens 106 to incoherently superpose or sum the intensity profiles associated with each of the 1D coherent beams 202 as described with respect to FIGS. 2A-2C above may also apply to the configuration of FIGS. 3A and 3B.

Figure 3C:
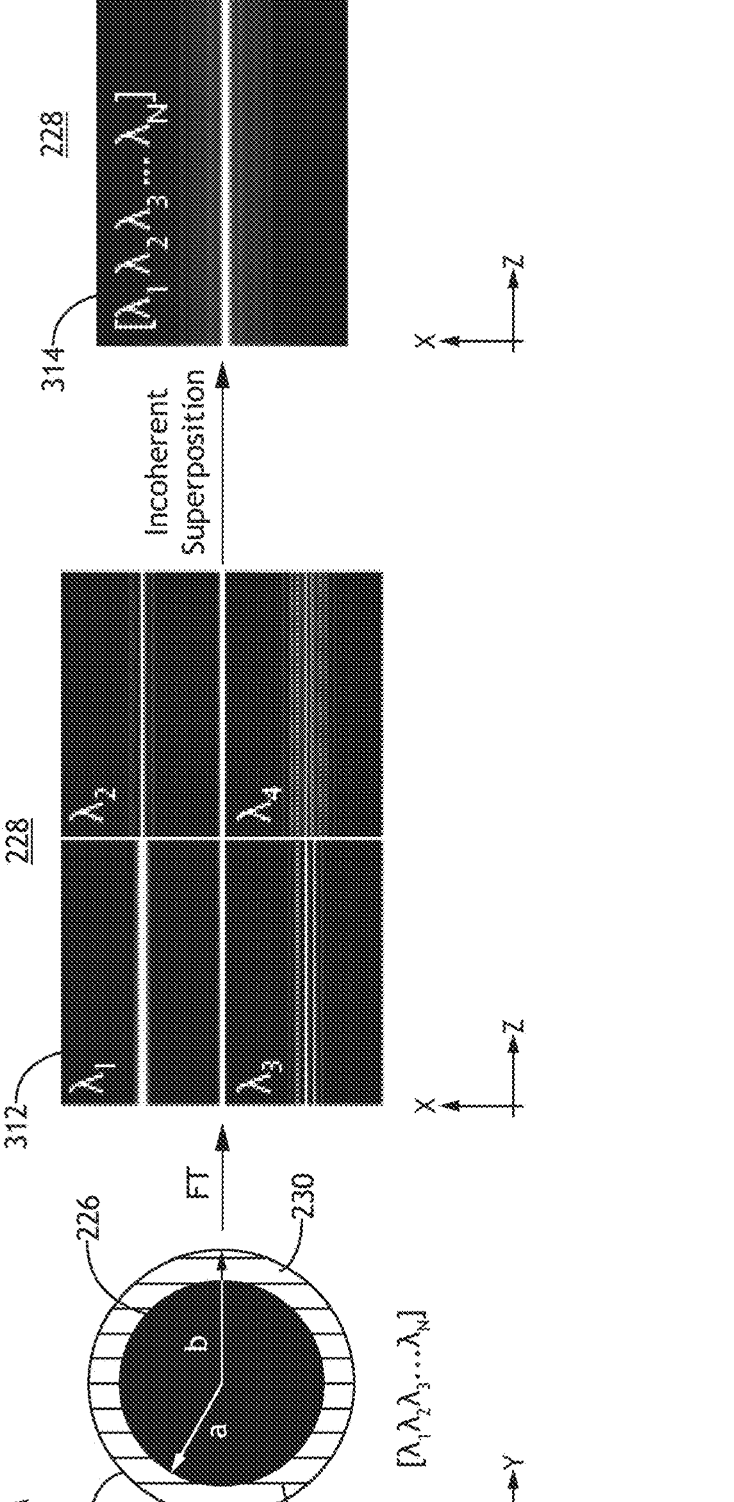
FIG. 3C includes a top view of the pupil plane illustrating a series of N exemplary 1D coherent beams and an annular pupil mask, intensity profiles for four of the exemplary 1D coherent beams in isolation, and an incoherent superposition of the intensity profiles to form an instantaneous Bessel light sheet, in accordance with one or more embodiments of the present disclosure.

Referring now to FIG. 3C, the incoherent superposition of a static distribution of 1D coherent beams 202 generated by a spatially-coherent polychromatic illumination source 104 to form an instantaneous Bessel light sheet 204 is illustrated in greater detail.

FIG. 3C includes a top view 310 of the pupil plane 212 illustrating a series of N exemplary 1D coherent beams 202 and an annular pupil mask 226, intensity profiles 312 for four of the exemplary 1D coherent beams 202 in isolation, and an incoherent superposition 314 of the intensity profiles 312 to form an instantaneous Bessel light sheet 204, in accordance with one or more embodiments of the present disclosure. FIG. 3C is thus substantially similar to FIGS. 2E and 2F but modified to illustrate 1D coherent beams 202 associated with different wavelengths of the spatially-coherent polychromatic illumination source 104. Accordingly, the descriptions above associated with FIGS. 2E and 2F may generally be applied to FIG. 3C.

The spatially-coherent polychromatic illumination source 104 may include any type of polychromatic source known in the art including, but not limited to, a diode laser or a supercontinuum laser. For example, a first inset 316 in FIG. 3A illustrates a configuration with a diode laser and a second inset 318 illustrates a configuration with a supercontinuum laser. Further, the light sheet microscopy system 100 may include a spectral filter 320 to control a spectrum of the illumination 222 directed to the light sheet generator 102.

Figures 3D, 3E, 3F:
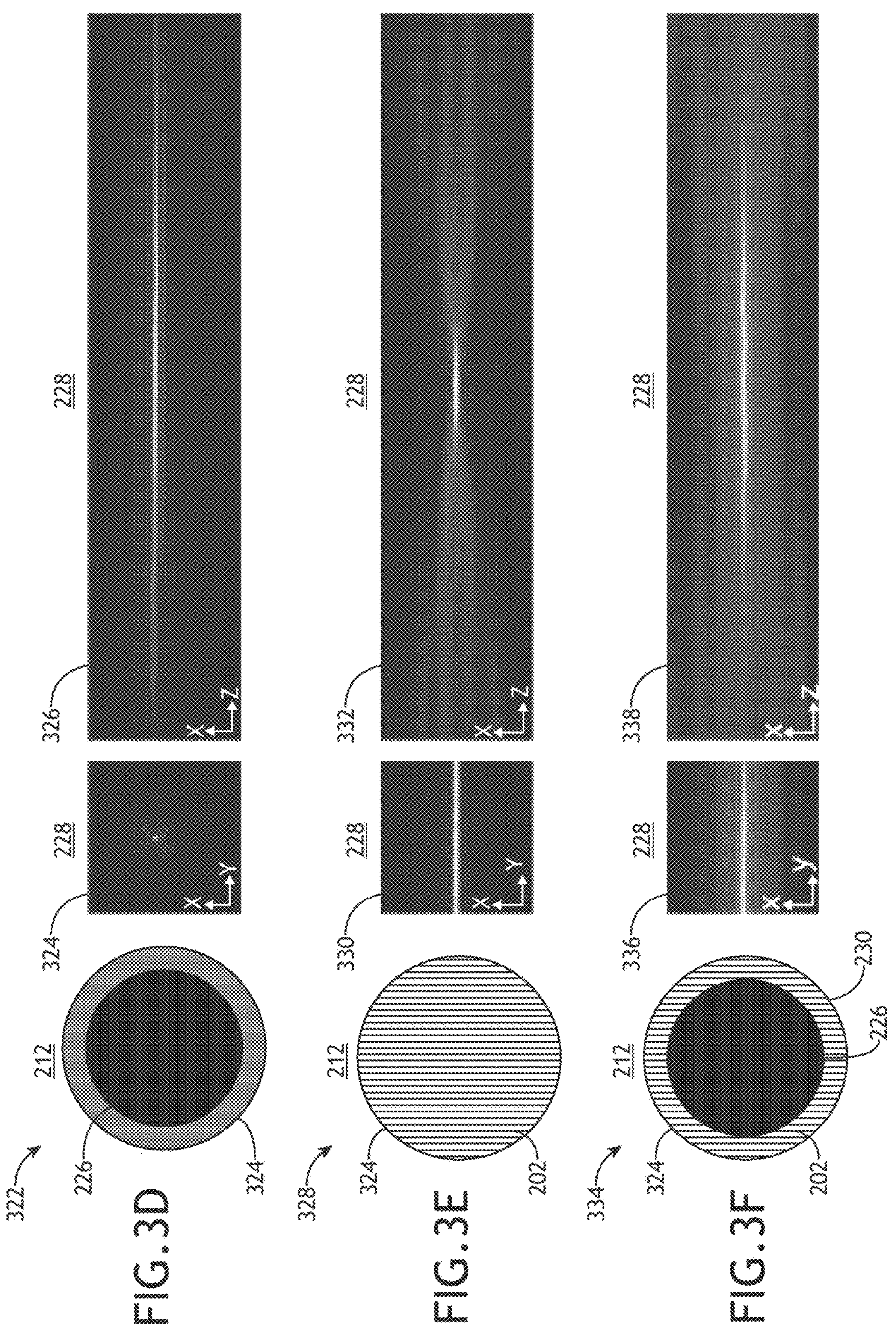
FIG. 3D includes a top view of a pupil plane with an annular pupil mask illuminated with uniform spectrally-coherent light to form a traditional Bessel beam, along with first and second plots of the resulting intensity profile of the Bessel beam, in accordance with one or more embodiments of the present disclosure.
FIG. 3E includes a top view of an unobstructed pupil plane with a static distribution of 1D coherent beams to form a Gaussian light sheet, along with first and second plots of the resulting intensity profile of the Gaussian light sheet, in accordance with one or more embodiments of the present disclosure.
FIG. 3F includes a top view of a pupil plane with an annular pupil mask illuminated with a static distribution of 1D coherent beams to form a Bessel light sheet, along with first and second plots of the resulting intensity profile of the Bessel light sheet, in accordance with one or more embodiments of the present disclosure.

As described with respect to FIGS. 2A-2P, various aspects of an instantaneous light sheet 204 may be adjusted or otherwise controlled by adjusting a pupil mask 226 located at the pupil plane 212. FIG. 3D includes a top view 322 of a pupil plane 212 with an annular pupil mask 226 illuminated with uniform spectrally-coherent light to form a traditional Bessel beam, along with first 324 and second 326 plots of the resulting intensity profile of the Bessel beam, in accordance with one or more embodiments of the present disclosure. FIG. 3E includes a top view 328 of an unobstructed pupil plane 212 with a static distribution of 1D coherent beams 202 to form a Gaussian light sheet 204, along with first 330 and second 332 plots of the resulting intensity profile of the Gaussian light sheet 204, in accordance with one or more embodiments of the present disclosure. FIG. 3F includes a top view 334 of a pupil plane 212 with an annular pupil mask 226 illuminated with a static distribution of 1D coherent beams 202 to form a Bessel light sheet 204, along with first 336 and second 338 plots of the resulting intensity profile of the Bessel light sheet 204, in accordance with one or more embodiments of the present disclosure. FIG. 3G includes first 340 and second 342 plots of the intensity distributions of FIGS. 3D-3F along the X and Z directions for direct comparison, in accordance with one or more embodiments of the present disclosure.

In particular, the data in FIGS. 3D-3G was generated with supercontinuum light source as the spatially-coherent polychromatic illumination source 104 coupled with a bandpass filter exhibiting the bandwidth of 18 nm or 7 nm at $\lambda_0$~635 nm in order to make sure that the 1D coherent beams 202 covered the entire pupil plane 212, whose diameter is 2 mm. Further, the corresponding values of the diameters of the annular pupil mask 226 were 5.01 mm and 1.96 mm, respectively. As illustrated in FIGS. 3D-3G, the instantaneous Bessel light sheet 204 had a propagation length (7.34 mm), which was approximately 5.5 times larger than the corresponding value of 1.34 mm for the instantaneous Gaussian light sheet 204. Further, the thickness of the instantaneous Bessel light sheet 204 was 8.8 μm measured at the full width at half maximum (FWHM), which was approximately 0.7 smaller than the corresponding value of 11.8 μm for the instantaneous Gaussian light sheet 204.

Referring now to FIGS. 3H-3O, the formation of C light sheets is described in greater detail. It is contemplated herein that the instantaneous Bessel light sheet 204 illustrated in FIG. 3D formed using illumination 222 from a supercontinuum laser source may not be suitable for all applications. In particular, the supercontinuum light source may provide a sufficiently large spectrum to generate 1D coherent beams 202 that span the entire pupil plane 212 along the incoherent direction. However, such sources are typically pulsed and thus exhibit relatively higher peak intensities than a CW source, which may damage a sensitive sample 112.

In one embodiment, the illumination source 104 includes at least one continuous-wave laser diode. Such sources may typically have a relatively narrow spectral bandwidth (e.g., in the range of 1-3 nm, or the like), which may preclude the formation of 1D coherent beams 202 that span the entire pupil plane 212 along the incoherent direction. However, it is contemplated herein that a static distribution of 1D coherent beams 202 along the incoherent direction covering only a portion of a pupil plane 212 with an annular pupil mask 226 may produce a C light sheet 204. Further, various aspects of such a C light sheet 204 such as, but not limited to, the thickness and extent of side lobes may be controlled by adjusting a position of the 1D coherent beams 202 in the pupil plane 212 and/or an area of the pupil plane 212 covered by the 1D coherent beams 202 (e.g., related to the bandwidth of the laser diode).

Figures 3H, 3I:
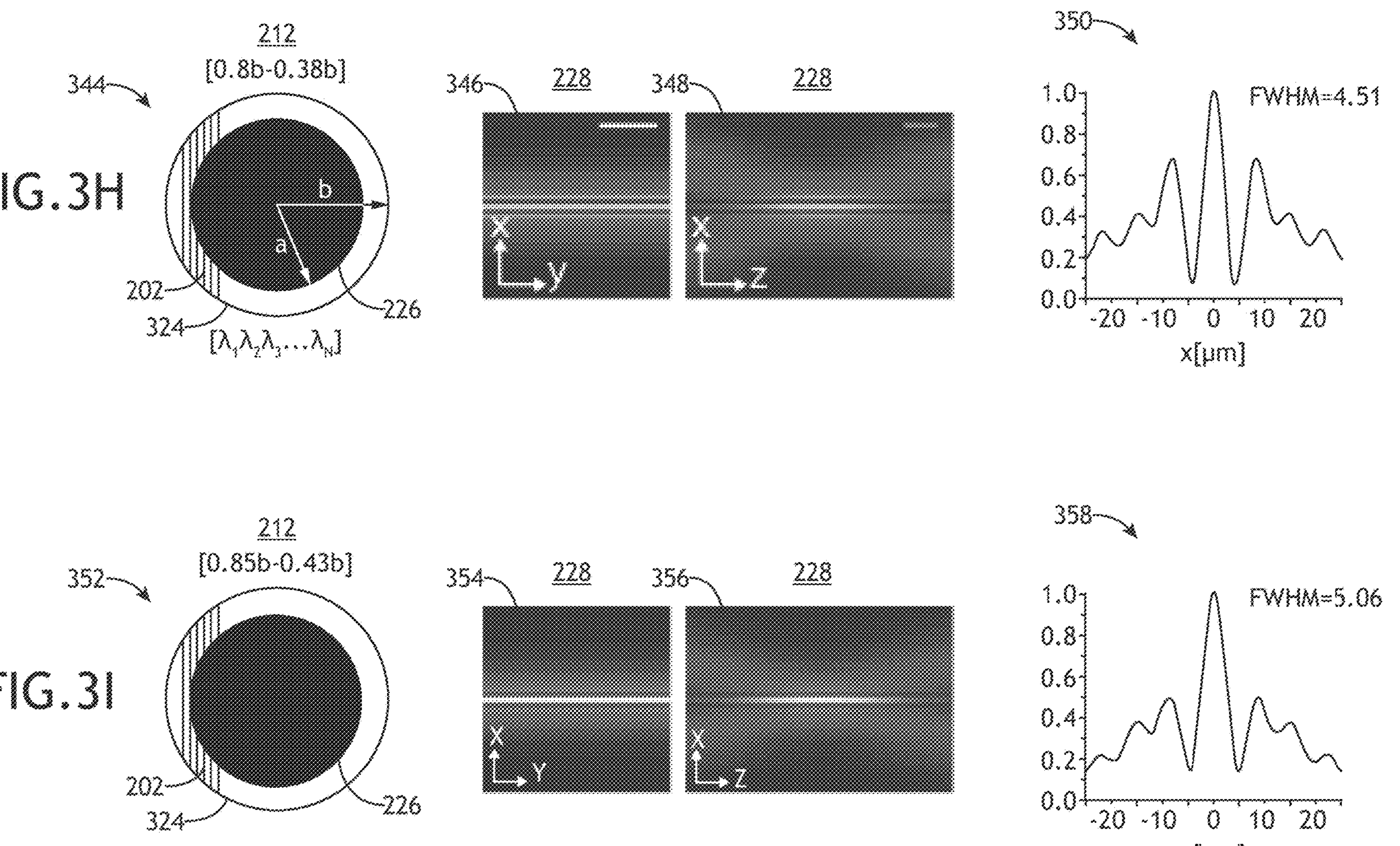
FIG. 3H includes a top view of the pupil plane with 1D coherent beams spanning a range of 0.8b-0.38b, a first and a second plot of the associated intensity profile of the C light sheet, and a cross-section of the intensity profile of the C light sheet, in accordance with one or more embodiments of the present disclosure.
FIG. 3I includes a top view of the pupil plane with 1D coherent beams spanning a range of 0.85b-0.43b, a first and a second plot of the associated intensity profile of the C light sheet, and a cross-section of the intensity profile of the C light sheet, in accordance with one or more embodiments of the present disclosure.
Figure 3J:
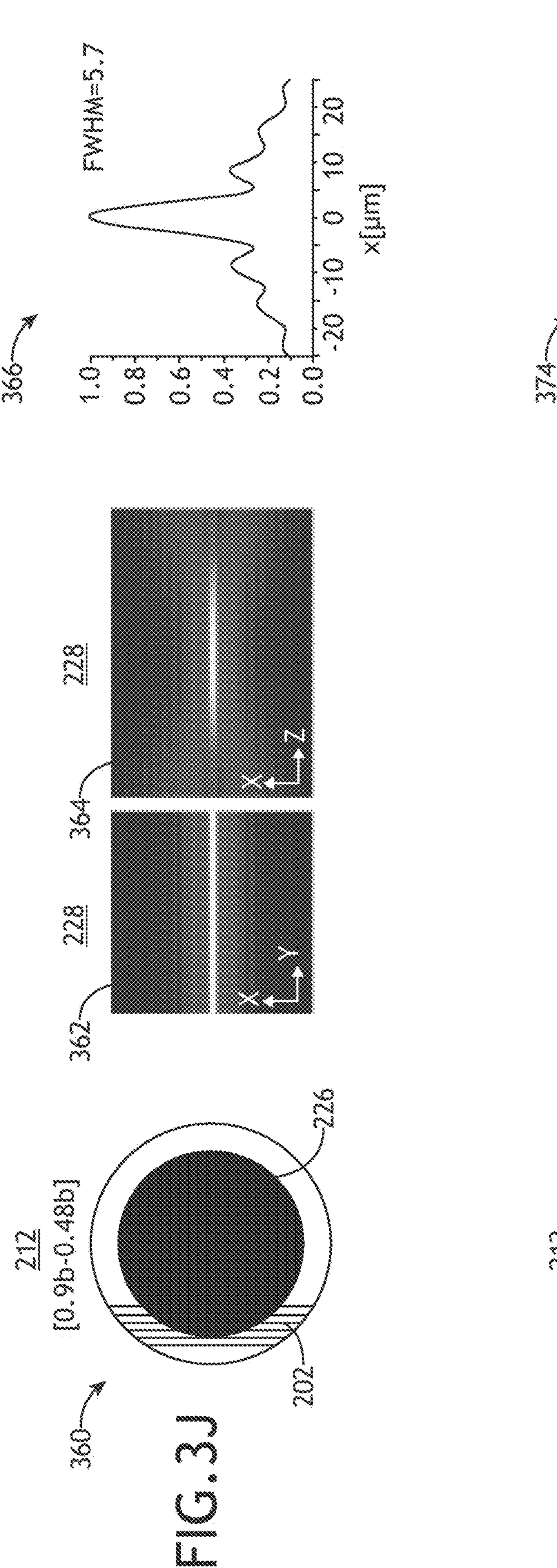
FIG. 3J includes a top view of the pupil plane with 1D coherent beams spanning a range of 0.9b-0.48b, a first and a second plot of the associated intensity profile of the C light sheet, and a cross-section of the intensity profile of the C light sheet, in accordance with one or more embodiments of the present disclosure.
Figure 3K:
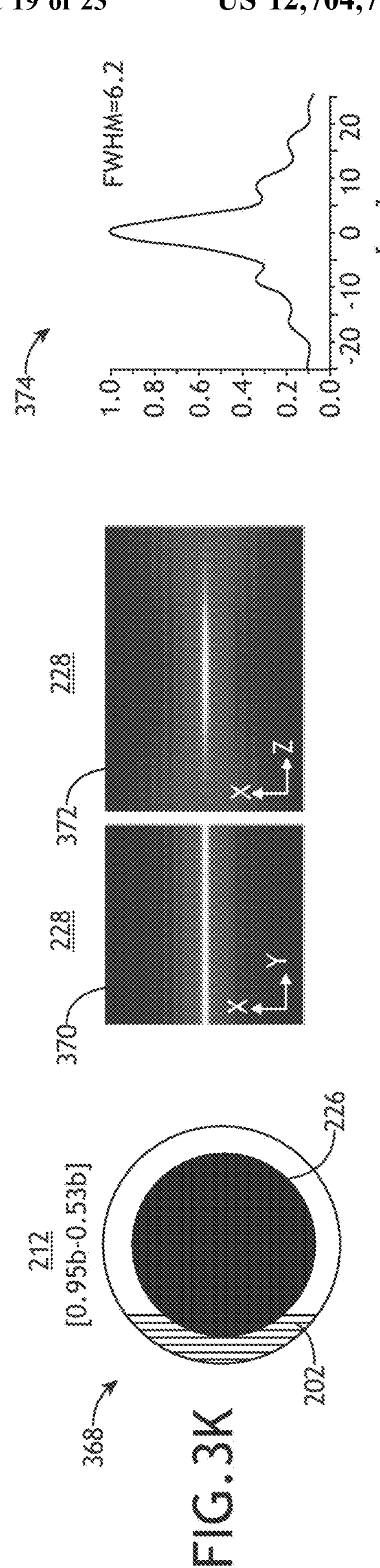
FIG. 3K includes a top view of the pupil plane with 1D coherent beams spanning a range of 0.55b-0.53b, a first and a second plot of the associated intensity profile of the C light sheet, and a cross-section of the intensity profile of the C light sheet, in accordance with one or more embodiments of the present disclosure.

FIG. 3H includes a top view 344 of the pupil plane 212 with 1D coherent beams 202 spanning a range of 0.8b-0.38b, a first 346 and a second 348 plot of the associated intensity profile of the C light sheet 204, and a cross-section 350 of the intensity profile of the C light sheet 204, in accordance with one or more embodiments of the present disclosure. FIG. 3I includes a top view 352 of the pupil plane 212 with 1D coherent beams 202 spanning a range of 0.85b-0.43b, a first 354 and a second 356 plot of the associated intensity profile of the C light sheet 204, and a cross-section 358 of the intensity profile of the C light sheet 204, in accordance with one or more embodiments of the present disclosure. FIG. 3J includes a top view 360 of the pupil plane 212 with 1D coherent beams 202 spanning a range of 0.9b-0.48b, a first 362 and a second 364 plot of the associated intensity profile of the C light sheet 204, and a cross-section 366 of the intensity profile of the C light sheet 204, in accordance with one or more embodiments of the present disclosure. FIG. 3K includes a top view 368 of the pupil plane 212 with 1D coherent beams 202 spanning a range of 0.95b-0.53b, a first 370 and a second 372 plot of the associated intensity profile of the C light sheet 204, and a cross-section 374 of the intensity profile of the C light sheet 204, in accordance with one or more embodiments of the present disclosure.

As illustrated by FIGS. 3H-3K, varying the central position and/or width of a portion of the pupil plane 212 covered by 1D coherent beams 202 allowed for substantive control over the thickness and extent of side lobes relative to a central peak of the light sheet 204.

Figures 3L, 3M, 3N:
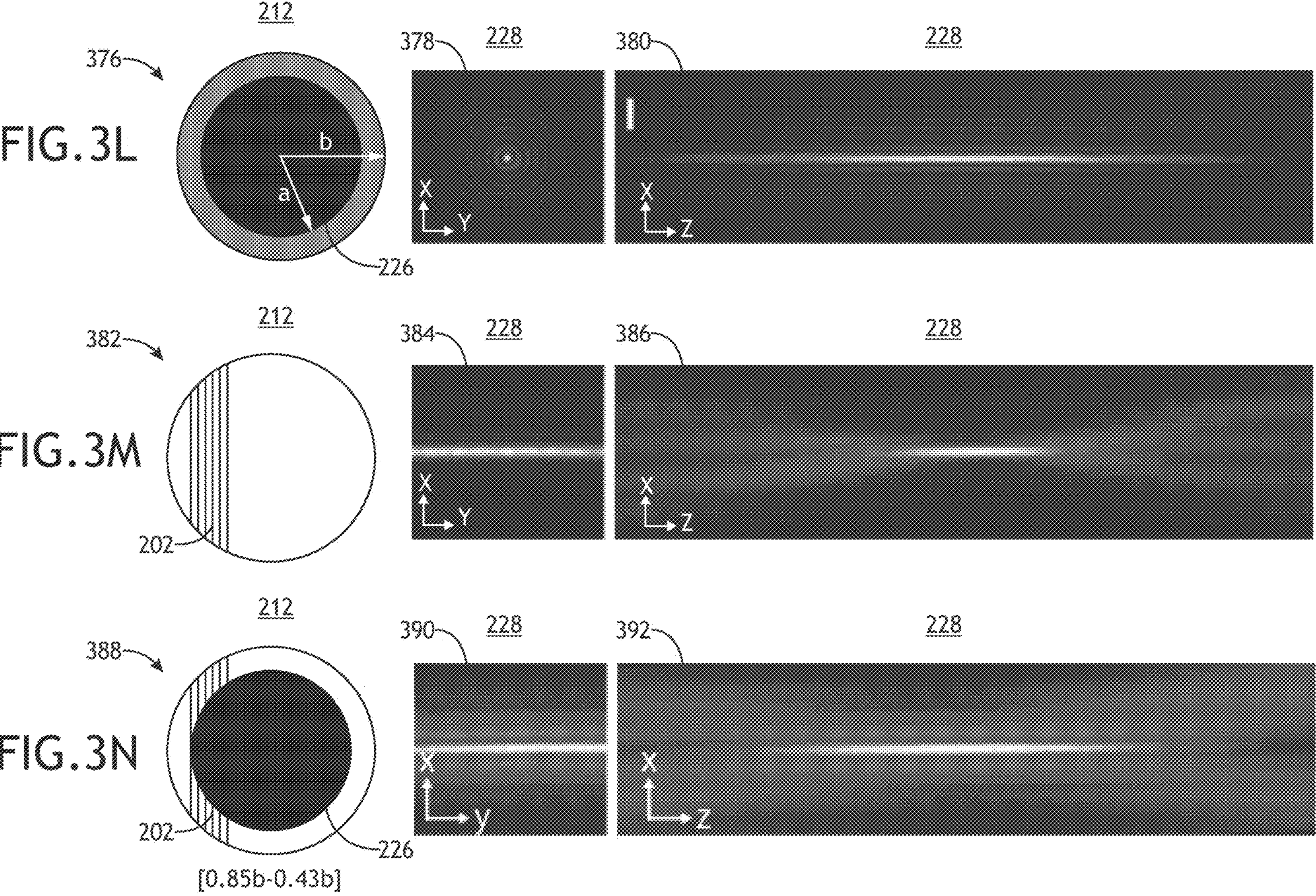
FIG. 3L includes a top view of a pupil plane with an annular pupil mask illuminated with uniform spectrally-coherent light to form a traditional Bessel beam, along with first and second plots of the resulting intensity profile of the Bessel beam, in accordance with one or more embodiments of the present disclosure.
FIG. 3M includes a top view of an unobstructed pupil plane with 1D coherent beams spanning a range of 0.85b-0.43b to form a Gaussian light sheet, along with a first and a second plot of the associated intensity profile of the Gaussian light sheet, in accordance with one or more embodiments of the present disclosure.
FIG. 3N includes a top view of a pupil plane including an annular pupil mask with 1D coherent beams spanning a range of 0.85b-0.43b to form a C light sheet, along with a first and a second plot of the associated intensity profile of the C light sheet, in accordance with one or more embodiments of the present disclosure.

FIGS. 3L-3O further illustrate experimental production of various types of light sheets 204 using a laser diode as a spatially-coherent polychromatic illumination source 104. FIG. 3L includes a top view 376 of a pupil plane 212 with an annular pupil mask 226 illuminated with uniform spectrally-coherent light to form a traditional Bessel beam, along with first 378 and second 380 plots of the resulting intensity profile of the Bessel beam, in accordance with one or more embodiments of the present disclosure. FIG. 3M includes a top view 382 of an unobstructed pupil plane 212 with 1D coherent beams 202 spanning a range of 0.85b-0.43b to form a Gaussian light sheet 204, along with a first 384 and a second 386 plot of the associated intensity profile of the Gaussian light sheet 204, in accordance with one or more embodiments of the present disclosure. FIG. 3N includes a top view 388 of a pupil plane 212 including an annular pupil mask 226 with 1D coherent beams 202 spanning a range of 0.85b-0.43b to form a C light sheet 204, along with a first 390 and a second 392 plot of the associated intensity profile of the C light sheet 204, in accordance with one or more embodiments of the present disclosure. FIG. 3O includes a first 394 and a second 396 plot of the intensity profiles associated with FIGS. 3L-3O along the X and Z directions, in accordance with one or more embodiments of the present disclosure.

As illustrated by FIGS. 3L-3O, a narrow bandwidth of the diode laser was sufficient to produce single-shot C light sheet 204. The propagation length of the C light sheet 204 was Δz=1.16 mm, which was ~2-times longer than the corresponding Gaussian light sheet 204 (Δz=0.64 mm) for the same thickness of light-sheets (Δx=5.9 μm).

Although not shown, it is further contemplated herein that a C light sheet 204 may be generated using a spatially-incoherent illumination source 104 based on the configuration of FIGS. 2A-2B, where only a portion of the pupil plane 212 along the incoherent direction is covered by 1D coherent beams 202.

Figure 4:
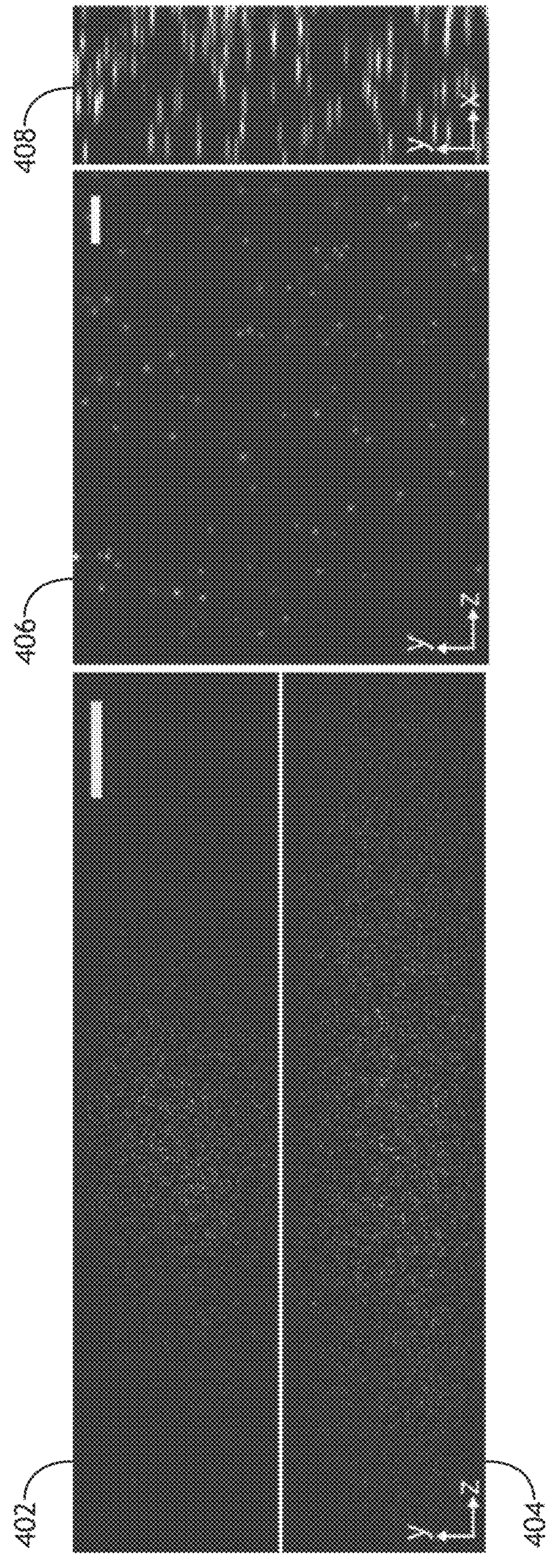
FIG. 4 includes a series of images of 1-micron fluorescent beads embedded in a 3D hydrogel imaged with a Gaussian light sheet and a C light sheet, in accordance with one or more embodiments of the present disclosure.

Referring now to FIG. 4, exemplary LSFM images are described. FIG. 4 includes a series of images of 1-micron fluorescent beads embedded in a 3D hydrogel imaged with a Gaussian light sheet 204 and a C light sheet 204, in accordance with one or more embodiments of the present disclosure. In particular, inset 402 illustrates imaging results with a Gaussian light sheet 204, inset 404 illustrates imaging results with a C light sheet 204, both with a 4×/NA0.13 collection objective lens 114. Further, inset 406 and inset 408 illustrate imaging results with the C light sheet 204 from different perspectives using a 50×/NA0.8 collection objective lens 114. As illustrated in FIG. 4, the C light sheet 204 provided a 1.8-fold increase in the field of view over the Gaussian light sheet 204, resulting in high-resolution imaging over the larger area.

Figure 5:
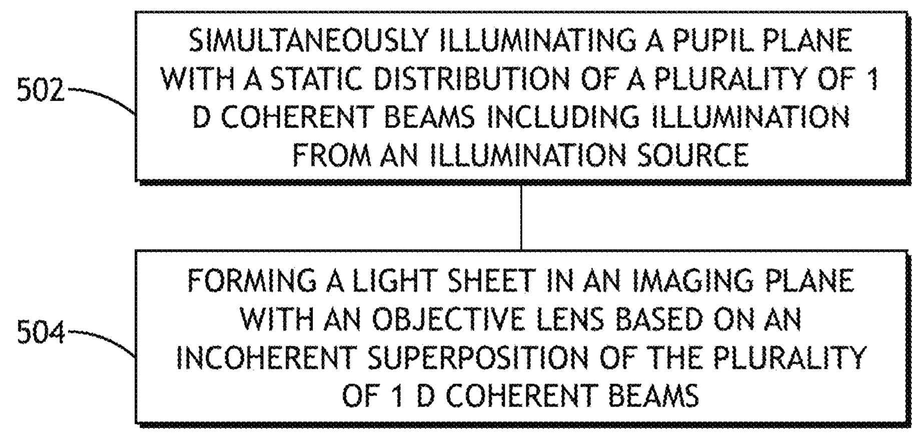
FIG. 5 is a flow diagram illustrating steps performed in a method for generating a light sheet, in accordance with one or more embodiments of the present disclosure.

Referring now to FIG. 5, FIG. 5 is a flow diagram illustrating steps performed in a method 500 for generating a light sheet, in accordance with one or more embodiments of the present disclosure. Applicant notes that the embodiments and enabling technologies described previously herein in the context of the light sheet microscopy system 100 should be interpreted to extend to the method 500. It is further noted, however, that the method 500 is not limited to the architecture of the light sheet microscopy system 100.

In one embodiment, the method 500 includes a step 502 of simultaneously illuminating a pupil plane with a static distribution of a plurality of 1D coherent beams including illumination from an illumination source. In particular, each of the 1D coherent beams of the plurality of 1D coherent beams may extend lengthwise along a coherent direction between boundaries of the pupil plane, have a width along an incoherent direction perpendicular to the coherent direction, and are distributed in a parallel distribution along the incoherent direction. Further, each of the 1D coherent beams of the plurality of 1D coherent beams may be spatially coherent along the coherent direction and spatially incoherent along the incoherent direction.

As described previously herein, it is contemplated herein that a static distribution of 1D coherent beams may be formed in various ways within the spirit and scope of the present disclosure. For example, a static distribution of 1D coherent beams may be formed using an extended spatially incoherent source, a cylindrical lens, and a slit. In the configuration, coherence along the coherent direction may be achieved by focusing light from the incoherent source through the slit. Further, the 1D coherent beams are incoherent with respect to each other since each is formed with light from a different location of the spatially incoherent source. By way of another example, a static distribution of 1D coherent beams may be formed using a polychromatic spatially coherent source, a dispersive element, and a cylindrical lens. In this configuration, light associated with each wavelength from the source is focused as a different 1D coherent beam in the pupil plane.

In another embodiment, the method 500 includes a step 504 of forming a light sheet in an imaging plane with an objective lens based on an incoherent superposition of the plurality of 1D coherent beams. In this way, the light sheet may extend along an optical axis of the objective lens and along a direction corresponding to the incoherent direction, where the light sheet has a thickness along a direction corresponding to the coherent direction. Further, various aspects of the light sheet such as, but not limited to, the type of light sheet (e.g., Gaussian, Bessel, C, or the like) or the strength of side lobes may be tuned by modifying the intensity and/or phase of the 1D coherent beams in the pupil plane. In this way, a light sheet may be tailored for a particular application or sample sensitivity to photodamage.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An illumination system comprising:

an illumination source;

a line-projection system configured to simultaneously illuminate a pupil plane with a static distribution of a plurality of one-dimensional (1D) coherent beams including illumination from the illumination source, wherein each of the 1D coherent beams of the plurality of 1D coherent beams extends lengthwise along a coherent direction between boundaries of the pupil plane, have a width along an incoherent direction perpendicular to the coherent direction, and are distributed in a parallel distribution along the incoherent direction, wherein each of the 1D coherent beams of the plurality of 1D coherent beams is spatially coherent along the coherent direction and spatially incoherent along the incoherent direction; and an objective lens configured to form a light sheet in an imaging plane based on an incoherent superposition of the plurality of 1D coherent beams, wherein the light sheet extends along an optical axis of the objective lens and along a direction corresponding to the incoherent direction, wherein the light sheet has a thickness along a direction corresponding to the coherent direction.

2. The illumination system of claim 1, wherein the light sheet comprises:

a static non-diffracting light sheet.

3. The illumination system of claim 1, wherein the illumination source comprises:

a pulsed illumination source.

4. The illumination system of claim 1, wherein the illumination source comprises:

a continuous-wave illumination source.

5. The illumination system of claim 1, wherein the illumination source comprises:

a spatially-coherent polychromatic illumination source.

6. The illumination system of claim 5, wherein the spatially-coherent polychromatic illumination source comprises:

at least one of a laser diode, a super-luminescent diode, or a supercontinuum laser.

7. The illumination system of claim 5, wherein the line-projection system comprises:

a dispersive element configured to spectrally disperse the illumination from the illumination source along the incoherent direction; and a cylindrical lens oriented with a nonzero focal power for light distributed along the incoherent direction and a zero focal power for light distributed along the coherent direction, wherein the pupil plane corresponds to a focal plane of the cylindrical lens.

8. The illumination system of claim 7, further comprising:

an annular aperture in the pupil plane, wherein the pupil plane corresponds to a relayed version of a back focal plane of the objective lens.

9. The illumination system of claim 8, wherein a distribution of the plurality of 1D coherent beams fully extends between boundaries of the pupil plane along the incoherent direction, wherein the light sheet comprises:

a Bessel light sheet.

10. The illumination system of claim 8, wherein a distribution of the plurality of 1D coherent beams extends between a selected portion of the pupil plane along the incoherent direction, wherein the light sheet comprises:

a C light sheet.

11. The illumination system of claim 7, wherein the pupil plane is unobstructed, wherein the light sheet comprises:

a Gaussian light sheet.

12. The illumination system of claim 1, wherein the illumination source comprises:

a spatially-incoherent illumination source.

13. The illumination system of claim 12, wherein the spatially-incoherent illumination source is extended at least along the incoherent direction, wherein the line-projection system comprises:

a cylindrical lens oriented with a nonzero focal power for light distributed along the coherent direction and a zero focal power for light distributed along the incoherent direction;

a slit aperture located at a focal plane of the cylindrical lens, wherein the slit aperture has a length extending along the incoherent direction and a width along the coherent direction; and a collimating lens positioned to collimate the illumination passing through the slit aperture prior to the pupil plane.

14. The illumination system of claim 13, wherein the incoherent illumination source comprises:

at least one of a light-emitting diode (LED) or a lamp source.

15. The illumination system of claim 13, wherein the incoherent illumination source comprises:

a laser diode; and a speckle reducer.

16. The illumination system of claim 13, further comprising:

an annular aperture in the pupil plane, wherein the pupil plane corresponds to a relayed version of a back focal plane of the objective lens.

17. The illumination system of claim 16, wherein a distribution of the plurality of 1D coherent beams fully extends between boundaries of the pupil plane along the incoherent direction, wherein the light sheet comprises:

a Bessel light sheet.

18. The illumination system of claim 13, wherein the pupil plane is unobstructed, wherein the light sheet comprises:

a Gaussian light sheet.

19. The illumination system of claim 12, wherein the spatially-incoherent illumination source is a first spatially-incoherent illumination source, wherein the system further comprises:

one or more additional spatially-incoherent illumination sources; and one or more beam combiners, wherein the one or more beam combiners combine illumination from the first spatially-incoherent illumination source with illumination from the one or more additional spatially-incoherent illumination sources along a common path prior to the line-projection system, wherein the objective lens forms one or more additional light sheets based on the illumination from the one or more additional spatially-incoherent illumination sources.

20. The illumination system of claim 19, wherein at least one of the one or more additional spatially-incoherent illumination sources has a different spectrum than the first spatially-incoherent illumination source.

21. An optical measurement device comprising:

an illumination source;

an objective lens;

a line-projection system configured to simultaneously illuminate a pupil plane associated with the objective lens with a static distribution of a plurality of 1D coherent beams including illumination from the illumination source, wherein each of the 1D coherent beams of the plurality of 1D coherent beams extends lengthwise along a coherent direction between boundaries of the pupil plane, have a width along an incoherent direction perpendicular to the coherent direction, and are distributed in a parallel distribution along the incoherent direction, wherein each of the 1D coherent beams of the plurality of 1D coherent beams is spatially coherent along the coherent direction and spatially incoherent along the incoherent direction;

an objective lens configured to form a light sheet in an imaging plane based on an incoherent superposition of the plurality of 1D coherent beams, wherein the light sheet extends along an optical axis of the objective lens and along a direction corresponding to the incoherent direction, wherein the light sheet has a thickness along a direction corresponding to the coherent direction;

a sample stage configured to secure a sample in the imaging plane;

a collection objective lens configured to capture light from the sample in response to the light sheet; and a detector configured to generate an image of the sample based on the light from the collection objective lens.

22. The optical measurement device of claim 21, further comprising:

an imaging lens configured to relay light from the collection objective lens to a detector.

23. The optical measurement device of claim 21, further comprising:

a spectral filter located prior to the detector configured to block wavelengths of light associated with the light sheet and pass wavelengths of light associated with fluorescence of the sample induced by the light sheet.

24. The optical measurement device of claim 21, wherein the sample stage is further configured to translate the sample, wherein the detector is further configured to generate a plurality of images of the sample associated with a plurality of positions of the sample.

25. The optical measurement device of claim 24, wherein the plurality of images of the sample form a three-dimensional image of the sample.

26. The optical measurement device of claim 21, wherein the illumination source comprises:

a spatially-coherent polychromatic illumination source.

27. The optical measurement device of claim 26, wherein the line-projection system comprises:

a dispersive element configured to spectrally disperse the illumination from the illumination source along the incoherent direction; and a cylindrical lens oriented with a nonzero focal power for light distributed along the incoherent direction and a zero focal power for light distributed along the coherent direction, wherein the pupil plane corresponds to a focal plane of the cylindrical lens.

28. The optical measurement device of claim 27, further comprising:

an annular mask in the pupil plane, wherein the pupil plane corresponds to a relayed version of a back focal plane of the objective lens.

29. The optical measurement device of claim 21, wherein illumination source comprises:

a spatially-incoherent illumination source.

30. The optical measurement device of claim 29, wherein the spatially-incoherent illumination source is extended at least along the incoherent direction, wherein the line-projection system comprises:

a cylindrical lens oriented with a nonzero focal power for light distributed along the coherent direction and a zero focal power for light distributed along the incoherent direction;

a slit aperture located at a focal plane of the cylindrical lens, wherein the slit aperture has a length extending along the incoherent direction and a width along the coherent direction; and a collimating lens positioned to collimate the illumination passing through the slit aperture prior to the pupil plane.

31. The optical measurement device of claim 30, further comprising:

a central obscuration in the pupil plane, wherein the pupil plane corresponds to a relayed version of a back focal plane of the objective lens.

32. The optical measurement device of claim 29, wherein the spatially-incoherent illumination source is a first spatially-incoherent illumination source, wherein the system further comprises:

one or more additional spatially-incoherent illumination sources; and one or more beam combiners, wherein the one or more beam combiners combine illumination from the first spatially-incoherent illumination source with illumination from the one or more additional spatially-incoherent illumination sources along a common path prior to the line-projection system, wherein the objective lens forms one or more additional light sheets based on the illumination from the one or more additional spatially-incoherent illumination sources.

33. The optical measurement device of claim 32, wherein at least one of the one or more additional spatially-incoherent illumination sources has a different spectrum than the first spatially-incoherent illumination source.

34. A method comprising:

simultaneously illuminating a pupil plane with a static distribution of a plurality of 1D coherent beams including illumination from an illumination source, wherein each of the 1D coherent beams of the plurality of 1D coherent beams extends lengthwise along a coherent direction between boundaries of the pupil plane, have a width along an incoherent direction perpendicular to the coherent direction, and are distributed in a parallel distribution along the incoherent direction, wherein each of the 1D coherent beams of the plurality of 1D coherent beams is spatially coherent along the coherent direction and spatially incoherent along the incoherent direction; and forming a light sheet in an imaging plane with an objective lens based on an incoherent superposition of the plurality of 1D coherent beams, wherein the light sheet extends along an optical axis of the objective lens and along a direction corresponding to the incoherent direction, wherein the light sheet has a thickness along a direction corresponding to the coherent direction.

* * * * *